United States Patent [19]

Wagatsuma et al.

[11] Patent Number: 4,801,186
[45] Date of Patent: Jan. 31, 1989

[54] COATED OPTICAL FIBER, FABRICATION PROCESS THEREOF AND FABRICATION APPARATUS THEREOF

[75] Inventors: Makoto Wagatsuma, Mito; Fumio Yamamoto, Katsuta; Takao Kimura; Yoshito Shuto, both of Mito; Shinzo Yamakawa, Katsuta, all of Japan

[73] Assignee: Nippon Telegraph & Telephone Public Corporation, Tokyo, Japan

[21] Appl. No.: 692,922

[22] Filed: Jan. 17, 1985

[30] Foreign Application Priority Data

Jan. 25, 1984 [JP] Japan ................................. 59-10323
May 29, 1984 [JP] Japan ................................. 59-107502

[51] Int. Cl.$^4$ ............................................. G02B 6/10
[52] U.S. Cl. ............................ 350/96.30; 350/96.29; 350/96.34
[58] Field of Search ............... 350/96.23, 96.29, 96.30, 350/96.33, 96.34

[56] References Cited

U.S. PATENT DOCUMENTS

| | | | |
|---|---|---|---|
| 4,116,654 | 9/1978 | Trehu | 364/421 |
| 4,133,664 | 1/1979 | Aulich et al. | 350/96.34 |
| 4,161,500 | 7/1979 | Schleinitz et al. | 264/1 |
| 4,167,305 | 9/1979 | Ichiba et al. | 350/96.34 |
| 4,264,649 | 4/1981 | Claypoole et al. | 427/163 |
| 4,351,657 | 9/1982 | Kimura et al. | 65/3.11 |

Primary Examiner—William L. Sikes
Assistant Examiner—Robert E. Wise
Attorney, Agent, or Firm—Spencer & Frank

[57] ABSTRACT

A coated optical fiber comprising an optical fiber; a first layer of a thermoplastic rubber composition which is disposed around the circumference of the optical fiber, has a Young's modulus of 0.1 GPa or less, and is capable of extrusion coating; and a second layer of a thermoplastic resin composition which is disposed around the circumference of the first layer, has a linear expansion coefficient of $1 \times 10^{-5}$° C.$^{-1}$ or less and a Young's modulus of 5 GPa or more, and is capable of extrusion coating. The coated optical fiber has excellent transmission characteristics at low and high temperatures and is inexpensive.

9 Claims, 15 Drawing Sheets

PRIOR ART

COATED OPTICAL FIBER, FABRICATION PROCESS THEREOF AND FABRICATION APPARATUS THEREOF

BACKGROUND OF THE INVENTION

1. Field of the Invention

The present invention relates to a coated optical fiber prepared by coating an optical fiber with first and second layers.

2. Description of the Prior Art

An optical fiber utilized for optical communication systems has a small outer diameter of generally 100 μm order and is a very fragile material. Thus, if such optical fibers are used without any reinforcement, they rupture at a strength which is very much lower than the original strength (about 7 kg) thereof, because of friction or generation of surface damage during the fabrication or cable-manufacturing process. Namely, it is not possible to form a transmission line with a high reliability. In this connection, there is proposed a method for coating the surface of an optical fiber immediately after spinning thereof with a plastic material in order to protect the surface of the optical fiber and to maintain the initial strength thereof.

Such plastic coating consists generally of a primary coating layer and a secondary layer. The primary coating layer is a buffer layer made of a material of a low Young's modulus and is intended to maintain the initial strength of the optical fiber and prevents an increase in the microbending loss of the fiber due to an uneven secondary coating. On the other hand, the secondary coating layer is made of a thermoplastic resin having a higher Young's modulus than that of the primary coating layer and has as its purpose to easily handle optical fibers in cabling or the like process therefor.

Heretofore, there have been proposed the following two types of coated optical fibers. One of the two types is a coated optical fiber having a tight construction in which a primary coating layer made of a thermosetting resin such as silicone resin or the like adheres tightly to a secondary coating layer made of a thermoplastic resin such as nylon, polyamide resin or the like. Another type is a coated optical fiber of the loose tube type having such a construction that a primary coating layer made of a thermosetting resin such as acrylic resins or the like is loosely held in a protective plastic tube (secondary coating layer) made of a thermoplastic resin such as polyethylene terephthalate, polypropylene or the like.

In either of the aforesaid tight and loose tube types of coated optical fibers, it is required that the primary coating layer adheres to the surface of an optical fiber in order to protect the optical fiber. Either of thermosetting and thermoplastic resins is applicable to the coating of an optical fiber as described above. However, the materials which have heretofore been industrially employed are limited to thermosetting resins such as silicone, urethane-acrylate, epoxy-acrylate or the like resins. For the sake of coating an optical fiber with a thermosetting resin as described above, an optical fiber immediately after spinning is coated with such a resin by means of an applicator such as a die or the like, and the resin thus coated is cured by heating or ultraviolet-ray irradiation.

However, such primary coating material of the thermosetting resin composition as described above and the coating method utilizing the coating material involve some problems from a viewpoint of economization of optical fiber cables. The reasons follows. The first disadvantage resides in that the coating materials are expensive. For example, silicone resin which has been widely used as a primary coating material is more expensive by one figure than that of a thermoplastic resin which is generally used. The second problem resides in that when the spinning rate of the optical fibers increases, slip arises between the coating materials and the optical fibers. Besides, these coating materials require two processes of coating and curing. As a consequence, the optical fibers cannot be coated with such coating materials. In other words, use of these coating materials is limited to a range wherein the coating rate thereof is comparatively low (100 m/min. or less in case of industrial fabrication). Furthermore, the third problem resides in that the transmission loss of an optical fiber coated with such type of materials as mentioned above increases at a low temperature of −60° C. or less, because of an increase of Young's modulus in a material for the primary coating layer in the vicinity of its crystallizing temperature or glass transition temperature.

On the other hand, in the case in which a nylon layer is used as a secondary coating layer, the transmission loss increases due to orientation relaxation or recrystallization of such nylon layer after the nylon layer is heated at a high temperature of +80° C. or more.

As primary coating materials other than those described above, thermoplastic resins such as ethylenevinyl acetate copolymer (EVA) and the like have been proposed in combination with a hot-melt method wherein a die for the coating operation is heated to melt the EVA. In this case, however, there are the same problems as those of the materials described above. Besides, the latter materials and such hot-melt method are not suitable for coating optical fibers of continuous length at a high speed, since the heating temperature is limited by the heat stability of the resin used.

As a method for coating a wire material with thermoplastic resin, use is generally made of an extrusion coating method in which an extruder is utilized in a technical field of coating metal wires such as those used for power lines, communication lines or the like. As a die-nipple construction of this case, there are two types, i.e., the pressure type construction shown in FIG. 1 and the tube type shown in FIG. 2.

More specifically, FIGS. 1 and 2 are typical views each showing a construction of a conventional die-nipple wherein reference numeral 1 designates a glass fiber, 2 concentrically disposed thermoplastic rubber composition and thermoplastic resin in the molten state, 3 a die, 4 a nipple, 5 the inner diameter of the nipple 4, 6 the distance from the extreme end of the nipple 4 to an outlet of the die 3, 7 the inner diameter of the die 3, and 8 the nozzle length of the die 3.

The pressure type means a construction wherein a metal wire is coated with a thermoplastic resin inside a die. The pressure type has advantages in that a coating layer adhering to metal wires is obtained and that high-speed coating of the wire is realized by controlling the pressure of the resin used.

On the other hand, in the tube type, a metal wire is coated with a tube-shaped resin which has been extruded while applying drawdown. The advantages of the tube type resides in that the thickness of the coating film is easily controlled and the coating is performed at a high-speed while maintaining a comparatively low coating tension In these die-nipple constructions, however, glass fibers cannot directly be coated with a thermoplastic resin. A major reason resides in the difference between the breaking characteristics of metal wires and glass fibers. More specifically, while breaking strength does not decrease in the case of metal wires even if they are in contact with a solid material, the breaking strength of glass fiber decreases easily if the glass fiber comes into contact with the inner surface of a nipple Thus, in the case of coating a glass fiber, it is necessary not only to make the clearance defined between a fiber and the inner surface of a nipple wider (usually, by several tens $\mu m$) than that in the case of coating a metal wire, but also to keep the coating tension as low as possible As a result, the coating tension increases due to the generation of excessive resin pressure, i.e., fiber breaking arises as well as back flow of the resin because of the high pressure through the inside of the nipple in this die-nipple construction of the pressure type. Accordingly, it is not possible to obtain a coating layer having a stable film thickness over a continuous length thereof at a rate of several tens m or more per minute.

On one hand, in the tube type construction, it is difficult to obtain a coating layer adhering to a fiber. Besides, such fibers vibrate, since a tube-shaped molten resin thus extruded does not effectively maintain the fiber centered (centering force), so that the fiber comes easily in contact with the inner surface of the nipple. For this reason, fiber strength decreases and in addition, the coating cannot be processed at a high speed.

As described above, there was a problem in economization for the fabrication of an optical fiber when the primary coating material of a thermosetting resin and the coating method which have heretofore been employed for the fabrication of a metal wire are used for the fabrication of an optical fiber. Furthermore, there was also such problem that a thermoplastic resin cannot be used for such primary coating material, since the extrusion coating method which has been utilized for metal wire coating cannot be applied to the coating of a fiber.

On the other hand, concerning the secondary coating layer, the linear expansion coefficient of materials used for both the tight and loose types are of the order of $10^{-4\circ}$ C.$^{-1}$ and such a value is far larger than that of fiber itself which is of the order of $10^{-7\circ}$ C.$^{-1}$. For this reason, in case of a tight coating fiber, the fiber causes microbending because of expansion and contraction of the secondary coating layer due to temperature change so that there is an increase in loss due to the microbending. Furthermore, in such a coated fiber of the tight type, a comparatively long cooling step of about several meters is required in the step for secondary coating. Such cooling step is performed so that the orientation in fibers along the longitudinal direction thereof which occurs in the extrusion coating step for secondary coating material is removed as much as possible by means of slow cooling. If such slow cooling is insufficient, relaxation of orientation proceeds even at ordinary temperatures so that the secondary coating layer contracts gradually. As a result, compressive strain is applied to fibers, and consequently microbending loss increases gradually. As the secondary coating step is speeded up, it becomes actually impossible to provide such a slow cooling step which can sufficiently correspond to such high-speed secondary coating step. In these circumstance, relaxation in orientation of such secondary coating layer causes a bottleneck so that the coating speed is limited to about several tens m/min Thus, it has been a problem that the coating speed cannot be increased as described above.

As another tight type coating fiber, there has been proposed a coated fiber in which glass fibers are appended longitudinally to fiber yarn stock having a silicone buffer layer along the length thereof, and they are fixed by curing a thermosetting resin applied thereon to form a secondary coating layer. The linear expansion coefficient of the secondary coating layer of the fiber core wire is of the order of $10^{-5\circ}$ C.$^{-1}$ and therefore, increase in microbending loss is remarkably suppressed. In this case, however, such a low linear expansion coefficient of the secondary coating layer is due to the linear expansion coefficient (in the order of $10^{-7\circ}$ C.$^{-1}$) of glass fiber, whilst the thermosetting resin itself has inevitably a high linear expansion coefficient (in the order of $10^{-4\circ}$ C.$^{-1}$). In addition, since thermosetting resin requires a comparatively long curing time, such a disadvantage that secondary coating speed is very slow still remains.

In a coated fiber of the loose tube type, loss due to macroscopic fiber bending caused by expansion and contraction of a protective plastic material forming a secondary coating layer is relaxed by affording suitably an extra length to the fiber in the loose tube. However, since a difference between linear expansion coefficients of the secondary coating layer and the fiber itself is significant, increase in microbending loss due to expansion and contraction of the secondary coating layer is still observed.

In order to prevent the increase in microbending loss due to a difference between the linear expansion coefficients of the secondary coating layer and the fiber, there has been proposed a coated fiber prepared by stretching and orientating a loose tube along the longer direction thereof at its melting point or less under solid state in the core wire manufacturing step. The linear expansion coefficient of the secondary coating layer of the coated fiber is $10^{-5\circ}$ C.$^{-1}$ or less and hence, increase in microbending loss is remarkably suppressed. There are, however, such disadvantages that a comparatively long heating oven is required for the stretching and orientation of loose tubes in order to fabricate a coated fiber of the loose tube type which is stretched and orientated as described above, that its production line becomes long, because it is required to place a heat-treating oven after a stretching-heating oven in order to prevent heat shrinkage of the stretched loose tube at a high temperature, that for this reason, it is difficult to increase the manufacturing speed, and that precise control for the manufacturing steps is necessary for controlling the extra length of the fiber.

As mentioned above, a thermoplastic resin having a lower cost than that of thermosetting resins may be used as a secondary coating material, and the above-mentioned extrusion coating may be adopted for the coating method therefor. In this case, however, it is premised on the use of a thermosetting resin as its primary coating material, so that the primary and secondary coating steps become inevitably separate steps regardless of continuous or discontinuous steps. In view of the above, economization of optical fibers based on an increase of the coating speed is limited in the coating techniques at present.

As set forth above, there were such disadvantages in the prior art that the microbending loss based on a difference between the linear expansion coefficients of the coating material and the fiber increases in both coating structures of the tight and loose tube types, so long as secondary coating materials (thermoplastic resins) which are employed at present are utilized, and further that its coating speed is limited and besides additional apparatus such as a heat-treating oven and the like is required, since the secondary coating layer is orientated in a coating method (extrusion coating) which is generally used at present on the basis of the former reason, so that loss due to its orientation relaxation increases.

SUMMARY OF THE INVENTION

The present invention has been made to eliminate the above described disadvantages involved in conventional coated optical fibers and has as an object to provide a coated optical fiber which has excellent transmission characteristics at low and high temperatures and which is inexpensive.

Another object of the present invention is to provide a process for fabricating a coated optical fiber by which a coated optical fiber having excellent transmission characteristics at low and high temperatures can be fabricated inexpensively at a high manufacturing speed.

A further object of the present invention is to provide a highly reliable process for fabricating a coated optical fiber by which use of wide thermoplastic resins as well as wide coating thickness and speed can be realized and which improves workability at the time of connecting these coated optical fibers with each other.

A still further object of the present invention is to provide an inexpensive and highly reliable apparatus for fabricating a coated optical fiber by which use of wide thermoplastic resins as well as wide coating thickness and speed can be realized and which improves workability at the time of connecting these coated optical fibers with each other.

In order to achieve the objects, in one aspect of the present invention, a coated optical fiber comprises an optical fiber; a first layer of a thermoplastic rubber composition which is disposed around the circumference of the optical fiber, has a Young's modulus of 0.1 GPa or less, and is capable of extrusion coating; and a second layer of a thermoplastic resin composition which is disposed around the circumference of the first layer, has a linear expansion coefficient of $1 \times 10^{-5\circ}$ C.$^{-1}$ or less and a Young's modulus of 5 GPa or more, and is capable of extrusion coating.

Here, the thermoplastic rubber composition of the first layer may contain a styrene copolymer or an olefine copolymer. The thermoplastic rubber composition of the first layer may comprise a styrene/butadiene block copolymer containing 20-40% by weight of styrene, a naphthenic processing oil, and a heat stabilizer as the major components. Each amount of the naphthenic processed oil and the heat stabilizer can be 5-150 parts by weight and 0.5-5 parts by weight, respectively, with respect to 100 parts by weight of the styrene/butadiene block copolymer. The thermoplastic resin composition of the second layer may comprise a resin exhibiting liquid crystallizability in molten state as the major component. The thermoplastic resin composition of the second layer may be composed of polyethylene terephthalate-p-hydroxybenzoic acid copolymer containing 40-70 mol % of p-hydroxybenzoic acid or a blend prepared from the copolymer and another polymer, and the resin composition may present a molecular orientation in the lengthwise direction of the fiber at a rate of shear of $10^2$ sec$^{-1}$ or more.

In a second aspect of the present invention, a coated optical fiber comprises a glass fiber having a light waveguide structure; a first layer of a thermoplastic rubber composition formed around the circumference of the glass fiber; and a second layer of a thermoplastic resin composition exhibiting liquid crystallizability in the molten state formed around the circumference of the first layer.

Here, the thermoplastic rubber composition of the first layer may contain a styrene copolymer or an ethylene-α-olefine copolymer. The thermoplastic rubber composition of the first layer may comprise A: a styrene/butadiene block copolymer (20-40 wt% styrene concentration),
B: a naphthenic processing oil, and
C: a heat stabilizer, as the major components, and concentrations of the respective components of the composition can be so determined that $$\frac{B}{A+B} = 5 - 40 \text{ wt \%} \text{ and } \frac{B}{A+B+C} \geqq 2 \text{ wt \%}.$$

The thermoplastic resin composition of the second layer may be selected from the group consisting of all aromatic polyesters, aromatic-fatty polyesters, all aromatic polyester amides, aromatic-aliphatic polyester amides, aromatic polyazomethines, aromatic polyestercarbonates, the mixtures thereof, or mixtures of the high-molecular materials with the other high-molecular materials. The thermoplastic resin composition of the second layer may be composed of a polyethylene terephthalate-p-hydroxybenzoic acid copolymer containing 40-70 mol % of p-hydroxybenzoic acid or a blend prepared from the copolymer and other polymer, and the resin composition may present molecular orientation in the lengthwise direction of the fiber at a rate of shear of $10^2$ sec$^{-1}$ or more.

In a third aspect of the present invention, a process for fabricating a coated optical fiber comprises the steps of spinning an optical fiber preform by heating to soften the optical fiber preform to form an optical fiber; and simultaneously coating the optical fiber with a first layer of a thermoplastic rubber composition and a second layer of a thermoplastic resin composition of molecular orientation immediately after the spinning step, so that the second layer is coated with the first layer.

In a fourth aspect of the present invention, a process for fabricating a coated optical fiber comprises the steps of spinning an optical fiber preform by heating to soften the optical fiber preform to form an optical fiber; simultaneously coating the optical fiber with a first layer of a thermoplastic rubber composition and a second layer of a thermoplastic resin composition of molecular orientation immediately after the spinning step; and cooling forcibly at least the second layer of the simultaneously coated first and second layers at a crystallization temperature of the molecular-orientated thermoplastic resin composition or less.

Here, the coated optical fiber may be cooled forcibly by the use of a coolant, which is selected from the group consisting of liquids, gases, or the mixtures thereof having a specific heat of 0.1 kcal/kg° C. or more at an ordinary temperature and a thermal conductivity of 0.01 kcal/m.hr.° C. or more. The molecular-orientated thermoplastic resin composition may be a thermotropic liquid crystalline high-molecular material exhibiting liquid crystallizability in the molten state. The molecular-orientated thermoplastic resin composition may be selected from polyethylene terephthalate-p-hydroxybenzoic acid copolymers containing 40-70 mol% of p-hydroxybenzoic acid or blends prepared from the copolymers and other polymers, and the resin composition may exhibit molecular orientation, in the lengthwise direction o the fiber at a rate of shear of $10^2 \text{sec}^{-1}$ or more. The thermoplastic rubber composition may contain a styrene copolymer or an ethylene-α-olefine copolymer The thermoplastic rubber composition may comprise a styrene/butadiene block copolymer containing 20-40% by weight of styrene, a naphthenic processing oil, and a heat stabilizer as the major components, and the amount of the naphthenic processing oil may be 5-150 parts by weight with respect to 100 parts by weight of the styrene/butadiene block copolymer.

The optical fiber may be simultaneously coated with the first and second layers by an applicator. The thus coated optical fiber may be caused to travel at a speed of V(m/sec). At least the second layer may be cooled before the coated optical fiber reaches a distance x satisfying the condition of $x/V \leq 1$, from the outlet of the applicator at a liquid crystal transition temperature of the liquid crystalline thermoplastic resin composition of the second layer or less.

In a fifth aspect of the present invention, in an apparatus for fabricating a coated optical fiber wherein immediately after spinning an optical fiber from an optical fiber preform by heating to soften the optical fiber preform the optical fiber is coated with a first layer of a thermoplastic rubber composition and a second layer of a molecular-orientated thermoplastic resin composition, the apparatus comprises an extruding machine for extruding the thermoplastic rubber composition and the molecular-orientated thermoplastic resin composition; and a crosshead for simultaneously coating the optical fiber with the extruded thermoplastic rubber composition and molecular-orientated thermoplastic resin composition to form the first and second layers around the optical fiber.

Here, the crosshead may have at least a set of a nipple and die. An extreme end portion of the nipple may form a straight pipe having an inner diameter of 0.5 mm or less, and the extreme end of the extreme end portion may be located in a nozzle of the die. The first layer and/or second layer coating materials may be extruded into a gap defined between the nipple and the die, so that the optical fiber is coated with the coating materials in the nozzle of the die.

The apparatus for fabricating a coated optical fiber may further comprise first cooling means disposed on the outlet side of the crosshead for cooling the coated optical fiber, and the interior of the cooling means may be filled with coolant which is brought into contact with the coated optical fiber to cool the coated optical fiber. Here, the apparatus for fabricating a coated optical fiber may further comprise second means for cooling the coolant which is to be introduced into the interior of the first cooling means; and means for circulating the coolant between the first cooling means and the second cooling means.

DETAILED DESCRIPTION OF THE PREFERRED EMBODIMENTS

Figure 1:
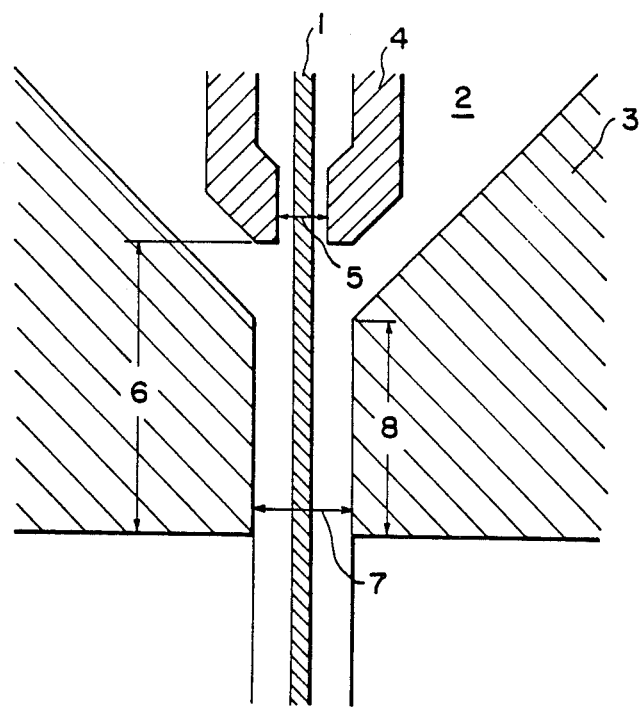
FIGS. 1 and 2 are schematic views each showing the construction of a conventional die-nipple for coating a metal wire.

The present invention was achieved as a result of research involving novel coating materials which may replace conventional liquid thermoplastic resins. The present inventors have studied thermoplastic resins and elastomers which are suitably applicable for an extrusion coating method by which high speed coating is possible and found that a resin composition comprising a styrene/butadiene/styrene block copolymer (hereinafter referred to simply as "SBS"), a processed oil, and a heat stabilizer as major components thereof was the most suitable for a first coating layer.

Various thermoplastic rubbers such as styrene elastomers, polyolefine elastomers, urethane elastomers, polyester elastomers, polybutadiene elastomers, nylon elastomers, the compositions obtained therefrom and the like are applicable for coating materials of the first layer of a coated optical fiber according to the present invention. Among others, particularly preferable are styrene elastomers, polyolefin elastomers, and the compositions thereof.

Styrene elastomers include styrene/ethylene.butylne/styrene block copolymer (SEBS), styrene/butadiene/styrene block copolymer (SBS), styrene/isoprene/styrene block copolymer (SIS) and the like. Among others, the most preferable is SBS.

More specifically, SBS has a lower Young's modulus and a lower glass transition temperature than those of the other thermoplastic resins and elastomers and besides SBS has properties required for coating materials in view of transmission loss Processed oil reduces significantly melt viscosity of a resin composition prepared by adding the processed oil to resin so that such resin composition is effective for the speeding up of the coating speed for an optical fiber. As well known, since SBS involves double bonds, it crosslinks and gels easily at a high temperature. In this respect, a heat stabilizer is effective for preventing such crosslinkage and gelation as well as increase in Young's modulus with time due to the crosslinkage.

A concentration of 40–95% by weight is suitable for SBS which is a major component of the resin composition according to the present invention, whilst a concentration of 5–60% by weight is suitable for processed oil which is another major component of the resin composition. While there is such an advantage in that a coat itself formed is highly reliable in the case where a concentration of SBS is high, there is such a disadvantage in that the coating speed is limited because of its high melt viscosity. On the contrary, when the concentration of SBS is low and hence the concentration of processed oil is high, there is such an advantage that its coating speed may be increased because the melt viscosity of the resin composition becomes low, but there is such a disadvantage that the reliability of the coat itself formed is impaired. Furthermore, processed oil has such advantages that it decreases not only the melt viscosity of a resin composition, but also Young's modulus thereof.

Although a concentration of heat stabilizer is not specifically limited, such heat stabilizer is generally used within a range of 0.05–5%.

A thermoplastic elastomer called generally SBS may be classified roughly into two categories, i.e., linear and radial types, and both of them are applicable for the present invention. While SBS of such linear type includes various structures such as $S_1B_1S_2$, $B_1S_1B_2S_2$ and the like (wherein $S_1$ and $S_2$ indicate styrene blocks, and $B_1$ and $B_2$ indicate butadiene blocks), the structure and manufacturing process of SBS per se used in the present invention are not particularly limited. Namely, the ratio of styrene block and butadiene block may arbitrarily be changed in such SBS.

Figure 3:
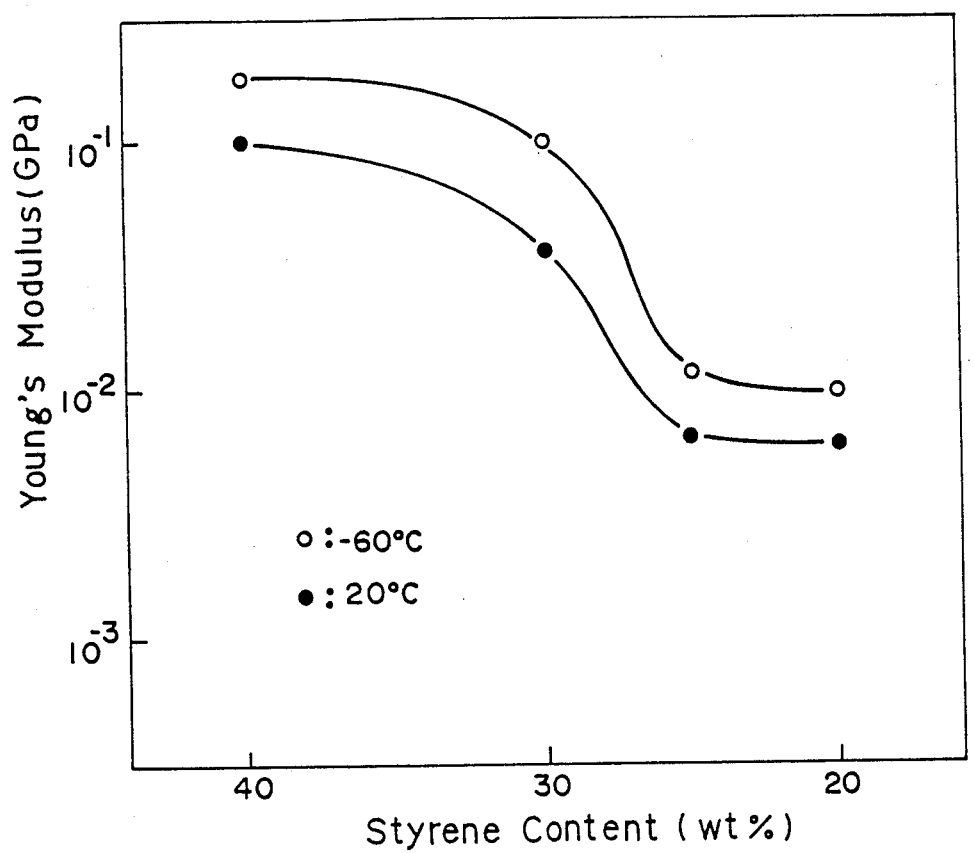
FIG. 3 is a graph illustrating the relationship between concentration of styrene and Young's modulus in SBS.

A range of SBS which may be contained in a resin composition used for the optical fiber coating material of the present invention will be described hereinbelow FIG. 3 is a graph illustrating the relationship between the concentration of styrene (weight %) in SBS (abscissa) and Young's modulus (GPa) thereof (ordinate). From FIG. 3, it is understood that conditions of 0.1 GPa or less of Young's modulus are satisfied by such composition having 40% by weight or less styrene concentration. However, as the styrene concentration is decreased, the heat stability of SBS deteriorates so that the coating of fibers becomes impossible. While such an advantage that the Young's modulus of SBS reduces is obtained in the case where the concentration of styrene is reduced, there is such a disadvantage that the coating properties deteriorate because flowability of such resin composition decreases. Conversely, although the flowability becomes favorable in the case where the concentration of styrene becomes high, Young's modulus also becomes high so that it is not preferable from the viewpoint of the transmission loss of coated optical fibers.

It is a requisite for the resin composition used for the first layer of the present invention that the Young's modulus thereof is 0.1 GPa or less at ordinary temperature as mentioned above. Such optical fibers coated with a resin composition having Young's modulus which exceeds 0.1 GPa increase easily transmission loss.

It is required that the gelation time at coating temperature is 30 seconds or more as a standard for heat stability under which fibers can be coated. Since such a resin composition having less than 30 seconds gelation time exhibits poor heat stability, there is such a case where crosslinkage appears, Young's modulus of the resin composition increases and transmission loss of the coated optical fiber increases, and there is also such an outstanding case where gelation is observed at the time of coating an optical fiber so that no coating is formed.

It was found that such composition satisfying such conditions that the gelation time of SBS containing 2% by weight of Irganox 1010 (manufactured by Ciba Geigy S.A.) as a heat stabilizer is 30 seconds or more at 260° C. which is selected as a usual coating temperature was limited to a composition having a styrene concentration of 20% by weight or more. For this reason, the concentration of styrene contained in SBS is limited to a range of 20–40 weight %.

Furthermore, it is preferable that the rubber composition utilized in the present invention has a melt viscosity of $10^5$ poise or less at the time of coating the rubber composition.

In general, the coating temperature is in the range 150–260° C. When the melt viscosity exceeds $10^5$ poise, flowability of such resin composition becomes inferior even at a coating temperature within the aforesaid temperature range. As a result, the coating speed is limited.

Figure 4:
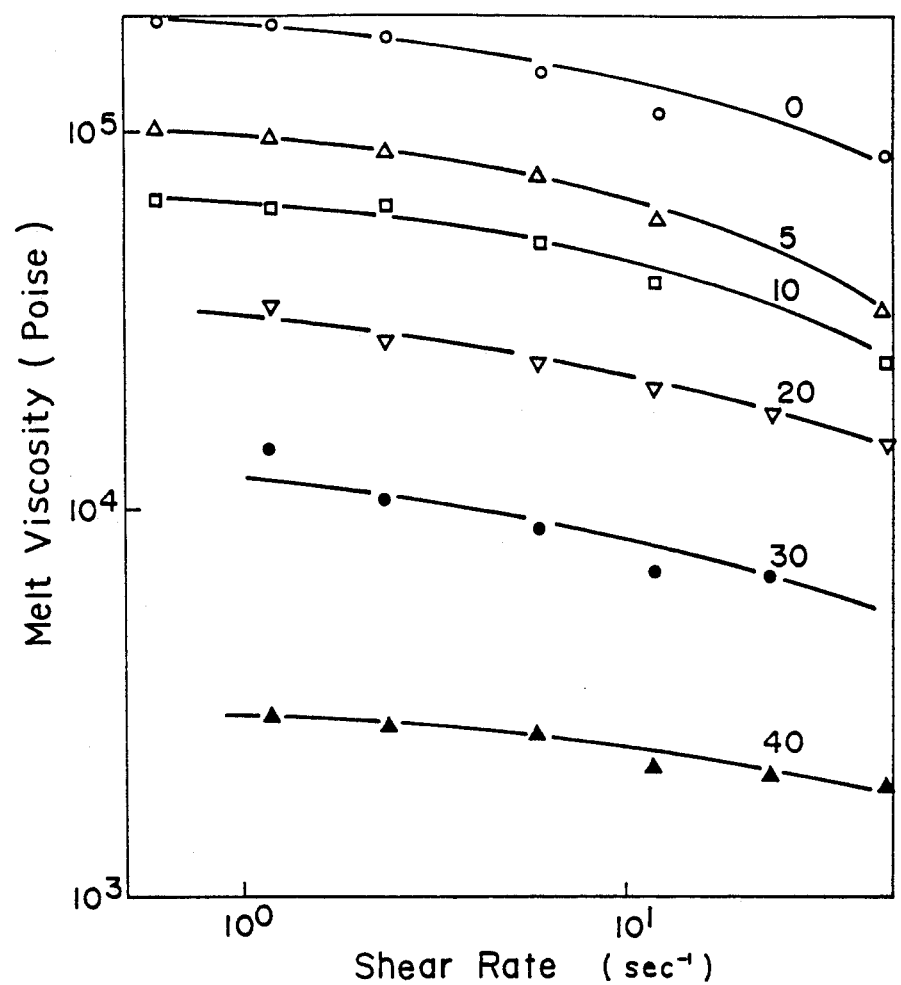
FIG. 4 is a graph illustrating the relationship between melt viscosity ad rate of shear in case of an SBS/processed oil composition at 260° C.

FIG. 4 is a graphical representation illustrating the relationship between the melt viscosity (ordinate) and the rate of shear (abscissa) in respect of SBS having 28 weight % styrene concentration, with a parameter of a concentration of naphthenic processed oil (wt. %) (the numbers appeared in FIG. 4) at 260° C. From FIG. 4, it is understood that compositions involving 5% by weight or more processed oil satisfies the above-described conditions. On the other hand, with an increase in concentration of such processed oil, resistance to blocking of SBS decreases. According to the research conducted by the present inventors, it was found that such an SBS composition containing processed oil of 60% by weight or more became sol and exhibited flowability even at an ordinary temperature.

A rubber composition layer exhibiting flowability at ordinary temperature cannot hold optical fibers therein, but merely functions as an interposed layer. In other words, when an external force is applied to the rubber composition layer, there are portions in which an optical fiber comes in direct contact with its second layer, so that such composition cannot be used as a coating material for the first layer according to the present invention.

Examples of the processed oil which can be used in the present invention include paraffinic processed oils, aromatic processed oils, naphthenic processed oils and the like. Among others, particularly preferable is a naphthenic processed oil compatible with the butadiene block in SBS. The naphthenic processed oils to be utilized in the present invention are not specifically limited by specific gravity, viscosity, pour point, aniline point, $C_A$, $C_N$, $C_P$ and the like.

Heat stabilizers employed in this invention are those generally referred to as antioxidants, aging inhibitors or the like. While types of such heat stabilizer are not particularly limited in the present invention, compounds as enumerated hereinbelow may generally be used singly or in combination with two or more of them. Examples of such compounds include zinc dibutyl thiocarbamate (ZDBC), tetrakis-[methylene-3-(3',5'-di-tertbutyl-4'-hydroxyphenyl) propionate]methane, phenothiazine, phenyl-α-naphthylamine, phenyl-β-naphthylamine, p-isopropoxydiphenylamine, N,N'-diphenyl-p-phenylenediamine, N-isopropyl-N'-phenyl-p-phenylenediamine, 2,6-di-tertbutyl-4-methylphenol, 4-hydroxymethyl-2,6-di-tertbutylphenol, 2,6-di-tert-butyl--dimethylamino-p-cresol, 2,2'-methylene-bis-(4-methyl-6-tert-butylphenol), 4,4'thiobis-(6-tert-butyl-3-methylphenol) and 1,3,5-trimethyl-2,4,6-tris (3,5-di-tert-butyl-4-hydroxybenzyl) benzene.

The resin composition according to the present invention comprises SBS, a processed oil and a heat stabilizer as the major components, and optionally thermoplastic resin, thermoplastic elastomer, liquid oligomer, silane coupling agent or the like can be added to the resin.

Additives optionally used n the present invention may include styrene elastomers such as styrene/isoprene block copolymers (SIS), styrene/ethylene.-butylene/styrene block copolymers (SEBS) and the like, olefine elastomers, urethane elastomers, polyester elastomers, 1,2-polybutadiene elastomers, polyethylene, polystyrene, petroleum resin or synthetic rubbers such as 1,4-polybutadiene, styrene-butadiene rubber (SBR) and the like, antiozonant, ultraviolet absorber, plasticizer, softener, lubricant and the like.

Furthermore, polyolefine elastomers utilized in the present invention may include copolymers of α-olefines such as propylene, 1-butene, 1-pentene, 1-hexene, 1-heptene, 1-octene, 1-nonene, 1-decene, 1-dodecene, 1-tetradecene, 1-hexadecene, 1-octadecene, allylcyclopentane, allylcyclohexane, allylbenzene, 3-methyl-1-butene, 3-cyclohexyl-1-butene, 3-phenyl-1-butene, 4-phenyl-1-butene, 3-methyl-1-pentene, 4-methyl-1-pentene, 4,4-dimethyl-1-pentene, 5-phenyl-1-pentene, 3-methyl-1-hexene, 4-methyl-1-hexene, 4,4-dimethyl-1-hexene, 5-methyl-1-hexene, 3,5,5 trimethyl-1-hexene, 5-methyl-1-heptene, 6-methyl-1-heptene, 4,6,6-trimethyl-1-heptene, vinylcyclopropane, vinylcyclopentane, vinylcyclohexane, 2-vinyl-bicyclo (2,2,1)-heptane and the like as well as copolymers of ethylene and the aforesaid α-olefines. Among others, particularly preferable are copolymers obtained from ethylene and α-olefines, and more preferable materials are copolymers prepared from ethylene and an α-olefine selected from the group consisting of propylene, 1-butene, 1-pentene, 1-hexene, 1-octene, 1-dodecene and 1-octadecene. These copolymers have low Young's modulus at a low temperature and also excellent formability.

In the present invention, the ratio of copolymerization for olefine elastomers is not specifically defined. Such olefine elastomers may be used alone. The olefine elastomers may also be used in the form of rubber compositions which contain optionally various processed oils and various additives such as plasticizer, antioxidant, adhesion imparting agent, aging inhibitor and the like as in the case of SBS.

Molecular-orientated thermoplastic resins to be used for a second layer coating material may be high molecular materials (thermotropic liquid crystalline high molecular materials) exhibiting liquid crystalline state in molten condition. Examples of the high molecular materials may include all aromatic polyesters, aromatic-aliphatic polyesters, all aromatic polyester amides, aromatic-aliphatic polyester amides, aromatic polyazomethines, aromatic polyester-carbonates, mixtures of the aforesaid high molecular materials, or mixtures of the aforesaid high molecular materials and the other high molecular materials, or reaction products obtained from the aforesaid high molecular materials and chain extenders and the like.

The all aromatic polyesters may include (1) copolymers obtained from one or more of aromatic dicarboxylic acids and one or more of aromatic diols via condensation thereof, (2) copolymers prepared by condensing one or more of aromatic hydrocarboxylic acids, and (3) copolymers prepared from one or more of aromatic dicarboxylic acids and one or more of aromatic diols as well as one or more of aromatic hydroxycarboxylic acids, through condensation thereof.

The aromatic-aliphatic polyesters may include (1) copolymers obtained from one or more of aromatic dicarboxylic acids and one or more of aliphatic diols and alicyclic diols via condensation thereof, (2) copolymers prepared from one or more of alicyclic dicarboxylic acids and one or more of aromatic diols through condensation thereof, and (3) copolymers prepared from one or more of aromatic hydroxycarboxylic acids and the dicarboxylic acid and diol in (1) or (2) through condensation thereof.

The all aromatic polyester amides may include (1) copolymers obtained from one or more of aromatic hydroxyamines and one or more of aromatic dicarboxylic acids via condensation thereof, (2) copolymers prepared from one or more of aromatic hydroxyamines, aromatic diamines, one or more of aromatic dicarboxylic acids, and one or more of aromatic diols through condensation thereof, and (3) copolymers produced from one or more of aromatic hydroxycarboxylic acids, one or more of aromatic hydroxyamines, aromatic diamines, one or more of aromatic dicarboxylic acids, and one or more of aromatic diols by means of condensation thereof.

The aromatic-aliphatic polyamides may include (1) copolymers prepared form one or more of aromatic hydroxyamines, aromatic diamines, one or more of aromatic dicarboxylic acids, and one or more of aliphatic diols by means of condensation thereof, and (2) copolymers produced from one or more of aromatic hydroxyamines, aromatic diamines, one or more of alicyclic dicarboxylic acids, and one or more of aromatic diols, aliphatic diols via condensation thereof.

The aromatic polyazomethines may include copolymers produced from one or more of aromatic dialdehydes and one or more of aromatic diamines through condensation thereof.

The aromatic polyester-carbonates may include (1) copolymers prepared by polymerizing one or more of aromatic diols, one or more of aromatic dicarboxylic acids, and phosgene ($COCl_2$), and (2) copolymers produced by polymerizing one or more of aromatic hydroxycarboxylic acids, one or more of aromatic diols, one or more of aromatic dicarboxylic acids and phosgene ($COCl_2$).

In this connection, specific examples of the aromatic dicarboxylic acids may include such aromatic dicarboxylic acids as terephthalic acid, 4,4'-diphenyldicarboxylic acid, 4,4'-triphenyl-dicarboxylic acid, 2,6-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylmethane-4,4'-dicarboxylic acid, diphenylsulfide-4,4'-dicarboxylic acid, diphenylsulfone-4,4'-dicarboxylic acid, diphenylketone-4,4'-dicarboxylic acid, diphenyldimethylmethane-4,4'-dicarboxylic acid isophthalic acid, 1,5-naphthalenedicarboxylic acid, and 1,4-naphthalenedicarboxylic acid as well as alkyl-, alkoxy, aryl- or halogen-substituents of the aforesaid aromatic dicarboxylic acids such as chloroterephthalic acid, dichloroterephthalic acid, bromoterephthalic acid, methylterephthalic acid, dimethylterephthalic acid, ethylterephthalic acid, phenylterephthalic acid, and methoxy terephthalic acid.

Examples of the aromatic diols may include such aromatic diols as hydroquinone, resorcine, 4,4'-diphenyl diol, 4,4'-triphenyl diol, 2,6-naphthalene diol, diphenyl ether-4,4'-diol, diphenoxy-ethane-4,4'-diol, diphenoxybutane-4,4'-diol, diphenylmethane-4,4'-diol, diphenylsulfide-4,4'-diol, diphenylsulfone-4,4'-diol, diphenylketone-4,4'-diol, diphenyl dimethylmethane-4,4'-diol, 1,5-naphthalene diol and 1,4-naphthalene diol as well as alkyl-, aryl-, alkoxy- or halogen-substituents of the aforesaid aromatic diols such as chlorohydroquinone, methylhydroquinone, phenyl-hydroquinone, t-butylhydroquinone, methoxyhydroquinone, 4-chlororesorcine, 4-methylresorcine and the like.

The aromatic hydroxycarboxylic acids may include such aromatic hydroxycarboxylic acids as p-hydroxybenzoic acid, m-hydroxybenzoic acid, 6-hydroxy-2-naphthoic acid, 5-hydroxy-1-naphthoic acid, 4-hydroxy-1-naphthoic acid, 6-hydroxy-1-naphthoic acid and the like as well as alkyl-, aryl-, alkoxy- or halogen-substituents of the aforesaid aromatic hydroxycarboxylic acids such as 3-methyl-4-hydroxybenzoic acid, 3-chloro-4-hydroxybenzoic acid, 3-phenyl-4-hydroxybenzoic acid, 3-methoxy-4-hydroxybenzoic acid and the like.

The aliphatic diols may include linear or branched aliphatic diols such as ethylene glycol, 1,3-propanediol, 1,4-butanediol, neopentyl glycol, 1,5-pentanediol, 1,6-hexanediol and the like.

The alicyclic diols may include such alicyclic diols as trans-1,4-cyclohexane diol, cis-1,4-cyclohexane diol, trans-1,4-cyclohexane dimethanol, cis-1,4-cyclohexane dimethanol and trans-1,3-cyclohexane diol as well as alkyl-, alkoxy- or halogen-substituents, of the aforesaid alicyclic diols such as trans-1,4-(1-methyl)cyclohexanediol, trans-1,4-(1-chloro) cyclohexanediol and trans-1,4-(1-methoxy) cyclohexanediol.

The alicyclic dicarboxylic acids may include such alicyclic dicarboxylic acids as trans-1,4-cyclohexanedicarboxylic acid, cis-1,4-cyclohexanedicarboxylic acid, trans-1,3-cyclohexanedicarboxylic acid and the like as well as alkyl-, alkoxy-or halogen-substituents of the aforesaid alicyclic dicarboxylic acids such as trans-1,4-(1-methyl) cyclohexanedicarboxylic acid, trans-1,4-(1-chloro) cyclohexanedicarboxylic acid and the like.

The aromatic hydroxyamines may include such aromatic hydroxyamines as p-hydroxyaniline, m-hydroxyaniline, 6-hydroxy-2-aminonaphthalene, 5-hydroxy-1-aminonaphthalene, 4-hydroxy-1-aminonaphthalene, 6-hydroxy-1-aminonaphthalene and the like as well as alkyl-, aryl-, alkoxy- or halogen-substituents of the aforesaid aromatic hydroxyamines such as 3-methyl-4-hydroxyaniline, 3-chloro-4-hydroxyaniline and the like.

The aromatic diamines may include such aromatic diamines as p-aminoaniline, m-aminoaniline, 2,6-diaminonaphthalene, 1,5-diaminonaphthalene, 1,4-diaminonaphthalene, 1,6-diaminonaphthalene and the like as well as alkyl-, aryl-, alkoxy- or halogen-substituents of the aforesaid aromatic diamines such as 3-methyl-4-aminoaniline, 3-chloro-4-aminoaniline, 3-phenyl-4-aminoaniline and the like.

The aromatic dialdehydes may include such aromatic dialdehydes as terephthalaldehyde, isophthalaldehyde, 2,6-naphthoaldehyde, 1,5-naphthoaldehyde, 1,4-naphthoaldehyde, 1,6-naphthoaldehyde and the like as well as alkyl-, aryl-, alkoxy- or halogen-substituents of the aforesaid aromatic dialdehydes such as 3-methylterephthal-aldehyde, 3-chloroterephthalaldehyde, 3-phenyl-terephthalaldehyde and the like.

Furthermore, the other high molecular materials to be used in blends with the above described thermotropic liquid crystals may include engineering resins such as polyethylene terephthalate, polybutylene terephthalate, polycarbonate, polyarylate, polyether sulfone, polysulfone, polyphenylene sulfide, polyether and the like, or thermoplastic elastomers such as polyether ester, SBS and the like.

In addition, chain extenders to be utilized for reaction with the aforesaid thermotropic liquid crystals may include 1,4-phenylene-bis-Δ2-oxazoline-2, 1,3-phenylene-bis-Δ2-oxazoline-2, 1,2-phenylene-bis-Δ2-oxazoline-2, 1,4-phenylene-bis(5-methyl-Δ2-oxazoline-2), 1,3-phenylene-bis(5-methyl-Δ2-oxazoline-2), 1,2-phenylene-bis-(5-methyl-Δ2-oxazoline-2), 1,3-phenylene-bis(4-methyl-Δ2-oxazoline-2), 1,4-phenylene-bis(4-methyl-Δ2-oxazoline-2), 1,2-phenylene-bis(4-methyl-Δ2-oxazoline-2), 1,3-phenylene-bis(4-ethyl-Δ2-oxazoline-2), 1,2-ethylene-bis-Δ2-oxazoline-2, 1,4-butylene-bis-A2-oxazoline-2, 1,2,4-phenylene-tris-Δ2-oxazoline-2 and the like.

A range of a composition applicable for a coating material of the second layer in the present invention will be described hereinbelow by taking a copolymer (PET/POB) prepared from polyethylene terephthalate (hereinafter referred to simply as "PET") and p-hydroxybenzoic acid (hereinafter referred to simply as "POB") as an example.

The term "thermotropic liquid crystal" herein used means a crystalline polymer exhibiting anisotropy of crystal together with fluidity of liquid before the polymer becomes liquid by heating to melt the polymer. A polymer to which no external force is applied so that it is in liquid crystalline state is generally an aggregate of domains which are in a certain arranged order. It is known that such domains deform and flow, and hence disintegrate so that high molecular chains orientate along the direction of flow, when mechanical external force is applied to such a system. As described above, since a liquid crystal orientates along the direction of flow thereof, it is known that the melt viscosity of thermotropic liquid crystal is remarkably low, and further that the higher the rate of shear, the lower the melt viscosity under shearing flow. PET/POB copolymer in the non-orientated state has a linear expansion coefficient of the order of $10^{-5}°C.^{-1}$ and a Young's modulus of several GPa and hence, such copolymer itself does not have a low linear expansion coefficient and high Young's modulus. However, such PET/POB copolymer being in orientated state exhibits low linear expansion coefficient and high Young's modulus along its orientated direction.

As a method for flowing and orientating thermotropic liquid crystal, there is a method for injecting the liquid crystal from a small nozzle. In other words, it is possible in injection or extrusion molding that high molecular chains are orientated in injecting or extruding direction by injecting such thermotropic liquid crystal from a small die. Since the liquid crystal thus orientated maintains its orientated state even after temperature drops, such liquid crystal exhibits low linear expansion coefficient and high Young's modulus along the direction of orientation.

In a preferred example of the present invention, a PET/POB copolymer under orientated state is used for the second coating layer on the basis of the fact that the PET/POB copolymer exhibits low linear expansion coefficient and high Young's modulus along the orientated direction. The degree of orientation of PET/POB copolymer depends remarkably upon a rate of shear at the time of extruding the copolymer.

Figure 5:
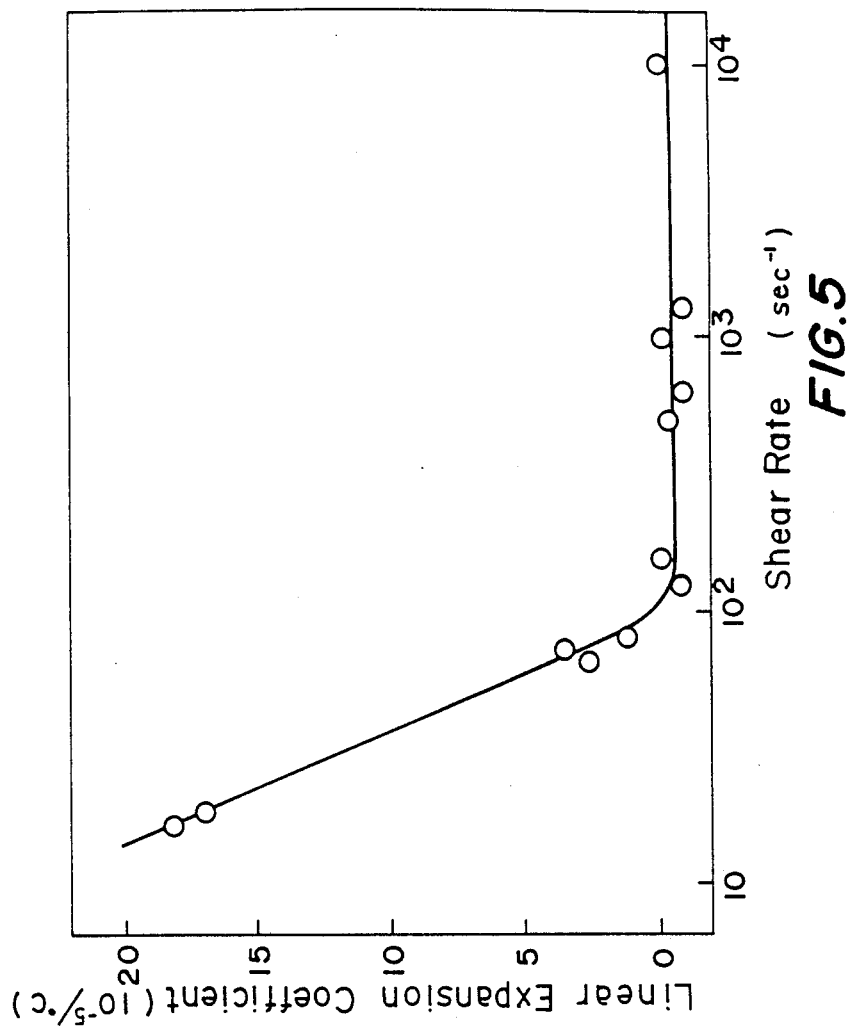
FIG. 5 is a graph illustrating the relationship between coefficient of linear expansion and rate of shear at 240° C. in case of PET/POB (40 mol % of PET)

FIG. 5 is a graphical representation illustrating the relationship between the rate of shear (sec$^{-1}$) (abscissa) and the coefficient of linear expansion ($10^{-5}$°C.$^{-1}$) along the extrusion direction (ordinate) in the case when a PET/POB copolymer (PET content being 40 mol%) is extruded from a nozzle by utilizing a capillary viscometer at 240° C. As is apparent from FIG. 5, it is understood that orientation is improved with the increase in the rate of shear, so that the coefficient of linear expansion becomes low. If the rate of shear is $10^2$ sec$^{-1}$ or more, the coefficient of linear expansion becomes $1 \times 10^{-5}$° C. or less. From the above results, it is found that such a PET/POB copolymer which has been orientated at a rate of shear of substantially $10^2$ sec$^{-1}$ or more is suitable for the second coating layer in the present invention. Further, in this case, it was observed that Young's modulus along the orientated direction was a high value of 10 GPa or more.

Figure 6A:
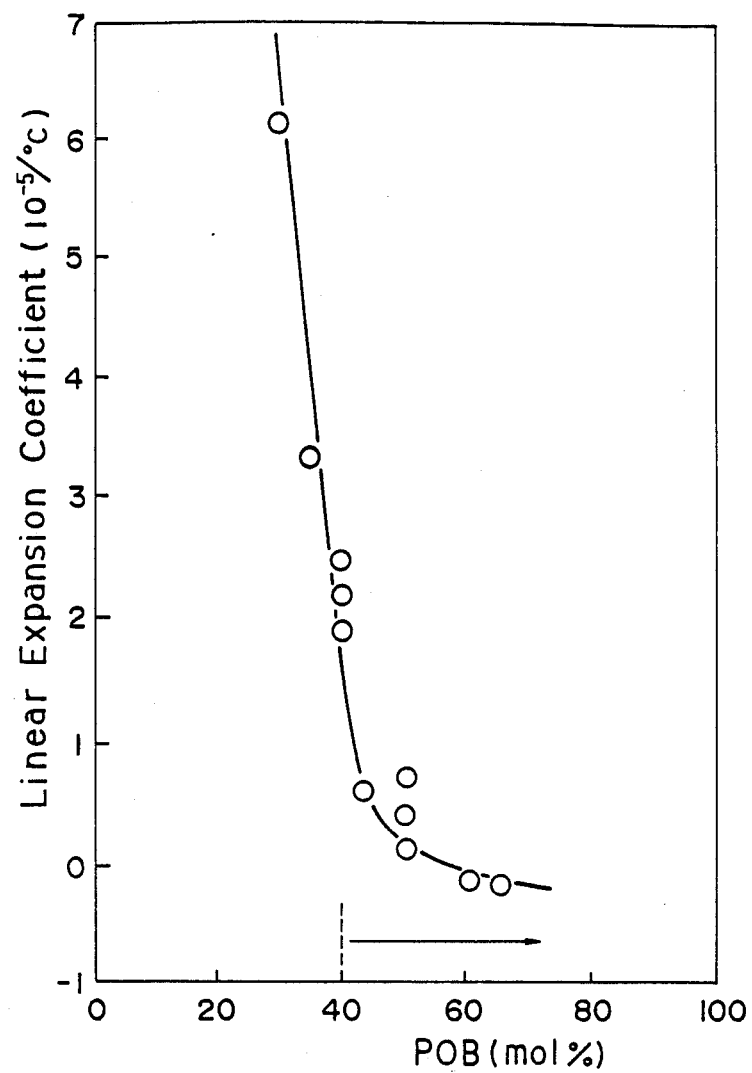
FIG. 6A is a graph illustrating the relationship between coefficient of linear expansion α of PET/POB extruded at a rate of shear of $10^3 \text{sec}^{-1}$ at an extrusion temperature of 240° C. and concentration of POB.
Figure 6B:
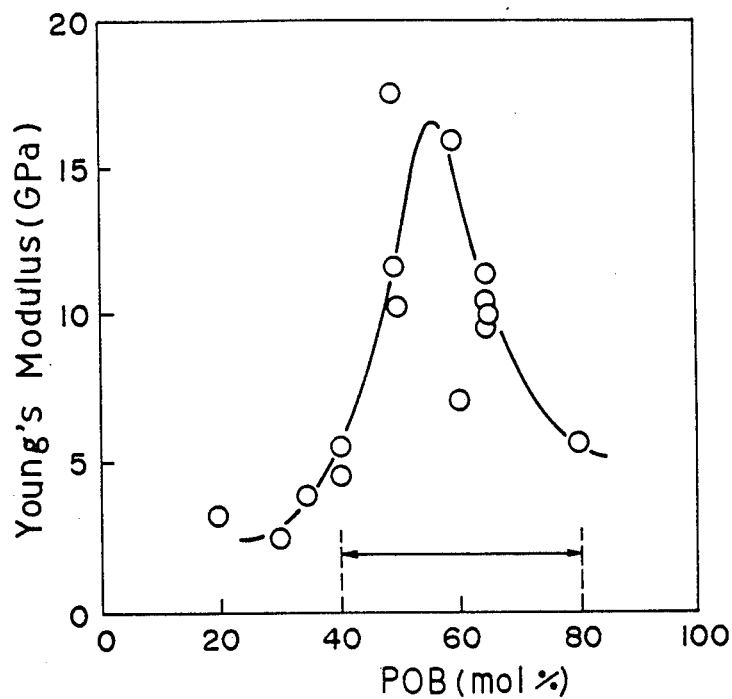
FIG. 6B is a graph illustrating the relationship between Young's modulus E of PET/POB extruded at a rate of shear of $10^3 \text{sec}^{-1}$ at an extrusion temperature of 240° C. and concentration of POB.

Ease of orientation or crystallizability of PET/POB copolymer depends significantly upon the amount of POB contained. FIG. 6A is a graphical representation illustrating the relationship of the coefficient of linear expansion ($10^{-5}$°C.$^{-1}$) (ordinate) of a PET/POB copolymer extruded at a shear rate of $10^3$ sec$^{-1}$ at 240° C. with an amount of POB (mol %) (abscissa). FIG. 6B is a graphical representation illustrating the relationship of the Young's modulus (GPa) (ordinate) of the PET/POB copolymer with an amount of POB (mol %) (abscissa). From the results, it is found that liquid crystallizability appears with the increase of POB mol % and hence the copolymer orientates easily, so that the linear expansion coefficient thereof decreases. It is also found that the coefficient of linear expansion becomes $10^{-5}$°C.$^{-1}$ or less when the amount of POB is about 40 mol %. As a result, it is found that the amount of POB is preferably 40 mol % or more in a PET/POB copolymer to be used for the second coating material.

With the increase of POB mol % in PET/POB copolymer, its linear expansion coefficient becomes low along the direction of orientation and the Young's modulus thereof becomes high, whilst there appears a disadvantage that elongation in the direction of orientation decreases remarkably so that the coated layer of such copolymer is easily broken down by bending the same. In this connection, the second coated layer of a fiber (coating outer diameter was 1 mm) coated with a PET/POB (=30/70) copolymer as the first coated layer (coating outer layer was 0.4 mm) was broken down at a bending radius of 5 mm.

As a result of detailed research of the relationship between POB content and allowable (breaking) bending radius, it was found that such allowable bending radius further increases with the increase of POB content. When easiness or the like for handling coated optical fibers is taken into consideration, it is required that the allowable bending radius be 5 mm or less. Thus, the upper limit of POB content in a PET/POB copolymer for the second coating layer according to the present invention is 70 mol %.

It is also possible to utilize blends of PET/POB copolymer and other polymers as the second coating materials. In this case, non-crystalline polycarbonate or thermoplastic polyether ester, or rubber compositions comprising these components as their major components can be effectively used as blend polymer, and it is preferable that a POB content in a blend prepared after blending the PET/POB copolymer with another polymer is within a range of 40-70 mol %.

Thermoplastic rubber compositions, particularly styrene elastomer compositions used in the present invention are soluble in organic solvents such as benzene, toluene and the like at an ordinary temperature. Thus, there is no fear of producing surface defects on optical fibers in stripping operation (i.e., removal of coated layer) necessary for connecting optical fibers to each other by using the above-described organic solvent Accordingly, there is such an advantage that an optical fiber of the present invention is excellent in connecting workability, and connecting portions of the optical fibers have high strength.

For the sake of concurrently coating an optical fiber with a first layer of a thermoplastic rubber composition and a second layer of a thermoplastic resin in the present invention, these materials are supplied to a crosshead by means of separate feeding apparatuses such as extruding machines or gear pumps. The crosshead has a die-nipple construction wherein an extreme end portion of the nipple forms a straight pipe having an inner diameter of 0.5 mm or less and the extreme end of the straight pipe locates inside a die nozzle.

Figure 7:
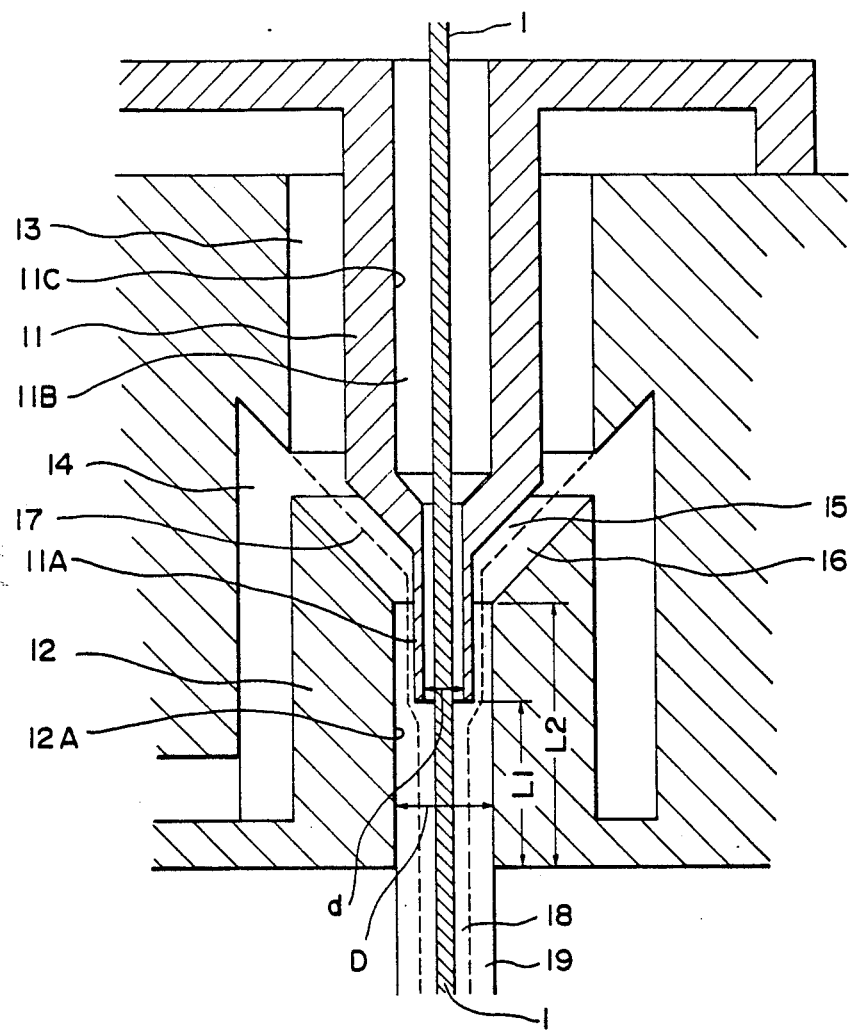
FIGS. 7 and 8 are sectional views each showing schematically an embodiment of a crosshead used in an apparatus for fabricating a coated optical fiber according to the present invention.

FIG. 7 is a sectional view showing schematically an embodiment of a die-nipple construction of the crosshead for simultaneously coating two layers according to the present invention.

The apparatus for fabricating a coated optical fiber in accordance with the present invention has been made on the basis of results of detailed research in respect of relationships of coating film thickness, unevenness and the strength of coated fibers with a construction of a crosshead, particularly a construction of a die-nipple.

A fundamental outline of an embodiment of a die-nipple construction of the present invention will be described in conjunction with FIG. 7.

In FIG. 7, reference numeral 11 designates a nipple through which an optical fiber 1 passes, and the extreme end portion 11A of which forms a straight pipe having an inner diameter d of 0.5 mm or less. A die 12 having an inner diameter D is placed with a predetermined distance with respect to the nipple 11. A supply passage 13 is formed concentrically along the circumference of the nipple 11, so that a thermoplastic rubber composition for forming a first layer is supplied through the passage 13. A supply passage 14 is also concentrically formed along the circumference of the die 12, so that a thermoplastic resin for forming a second layer is supplied through the passage 14. The rubber composition 15 and the resin 16 being in molten state after passing through both the supply passages 13 and 14 form two layers in a gap 17 defined between the nipple 11 and the die 12 as shown in FIG. 7 and they are delivered from the extreme end portion 11A of the nipple 11 to the outlet of the die 12. In FIG. 7, $L_1$ designates the distance from the extreme end portion 11A of the nipple 11 to the outlet of the die 12 and $L_2$ designates the nozzle length of the die 12.

In the gap 17 defined between the nipple 11 and the die 12, both the molten materials are accelerated up to a predetermined speed by means of an extruding machine while keeping the two-layered condition thereof. In this case, although there is produced a resin pressure corresponding to its flow velocity generated in the inlet portion of a nozzle 12A of the die 12, this resin pressure decreases because of viscous flow of the resin in the gap 17 between the nipple 11 and the die 12, so that the pressure is extremely low at the extreme end portion 11A of the nipple 11. Hence a tension applied to the fiber 1 reduces significantly as compared with that of the above-mentioned pressure type die-nipple construction. Besides, there is an extremely remote possibility that the resin flows in the reverse through the interior 11B of the nipple 11. Furthermore, the molten materials 15 and 16 flow adhesively together with the fiber 1 within a region of distance $L_1$ extending from the extreme end portion 11A of the nipple 11 to the outlet of the nozzle 12A of the die 12. For this reason, first and second coating layers 18 and 19 being adherent to the fiber 1 can be obtained unlike the case of the above-mentioned tube type die-nipple construction. In addition, a viscous flow derived from the molten rubber composition 15 and resin 16 functions to maintain the fiber 1 at the center of the die nozzle 12A, so that there is such an advantage that the possibility of eccentricity of the fiber 1 becomes very low and hence, such risk that the fiber 1 comes into contact with the inner surface 11C of the nipple 11 can also be prevented.

Figure 8:
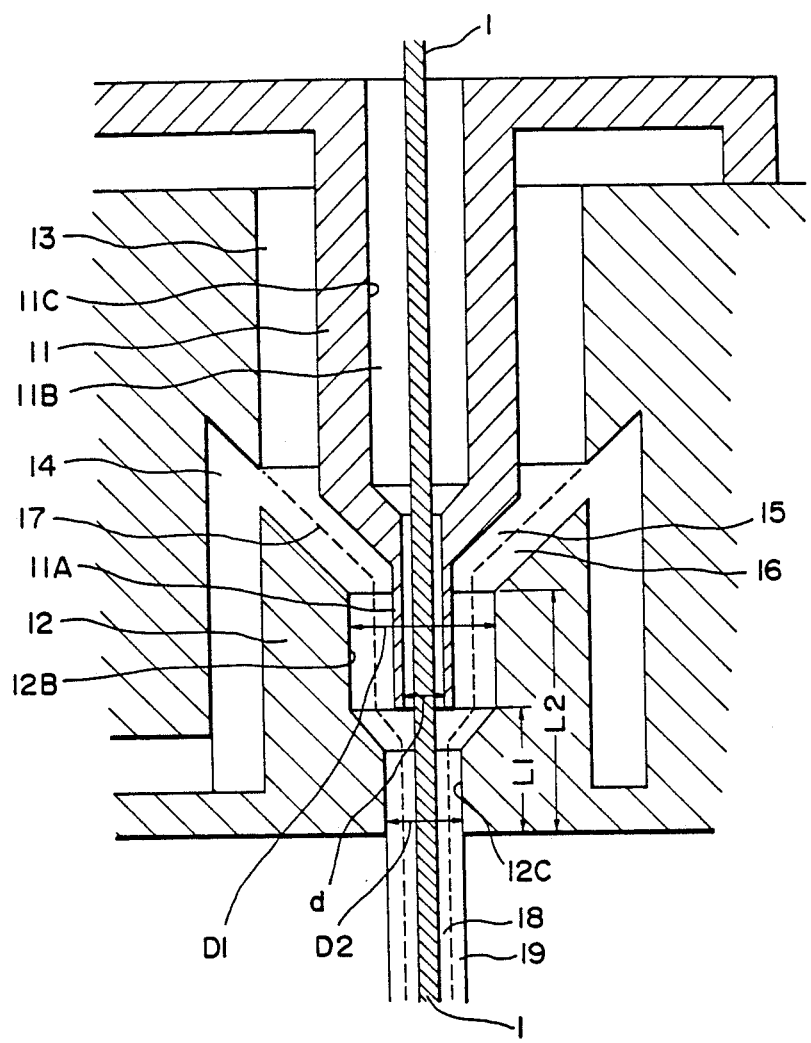

FIG. 8 illustrates another embodiment of the crosshead in an apparatus for fabricating a coated optical fiber according to the present invention. The crosshead has the same construction as that shown in FIG. 7 except that the inner diameter of the die 12 is formed in two stages, i.e., the inner diameter $D_1$ of a die nozzle portion 12B corresponding to the extreme end portion 11A of the nipple 11 is made larger, whilst the inner diameter $D_2$ of a die nozzle portion 12C positioned on the downstream side from the extreme end portion 11A of the nipple 11 is made smaller than the inner diameter $D_1$.

Figure 9:
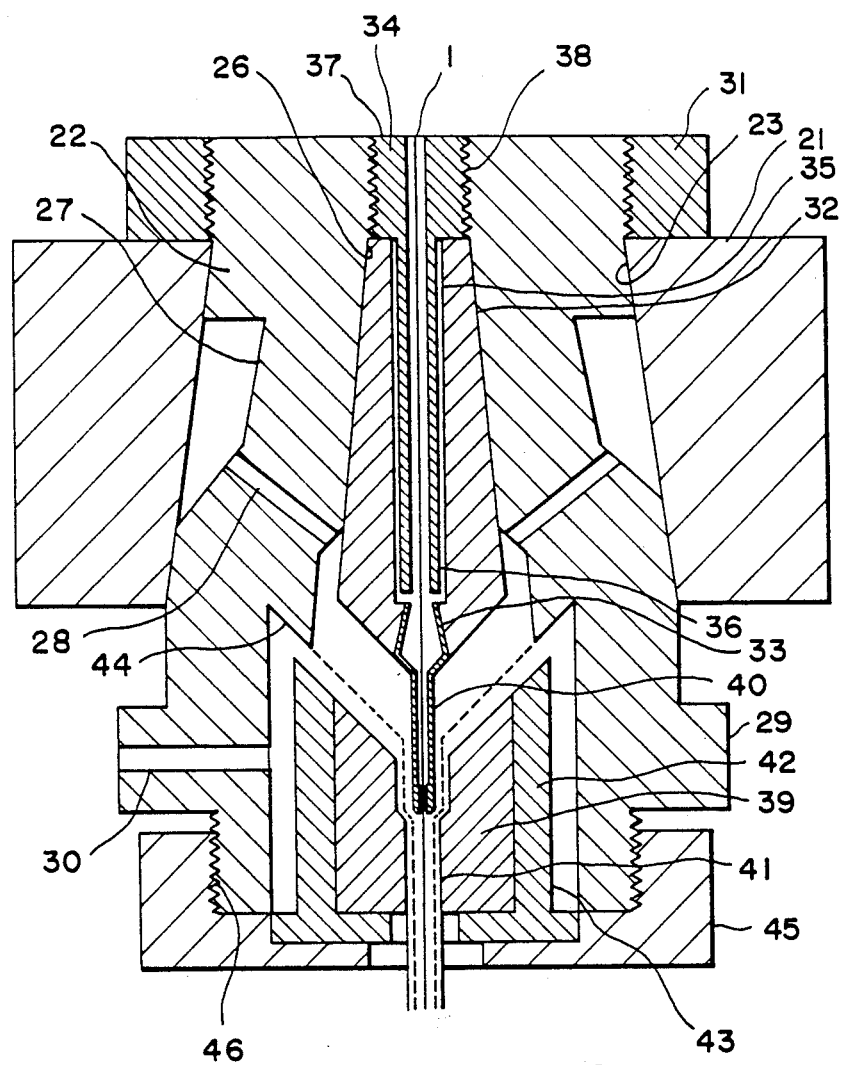
FIG. 9 is a sectional view showing an embodiment of a specific construction of such a crosshead.
Figure 10:
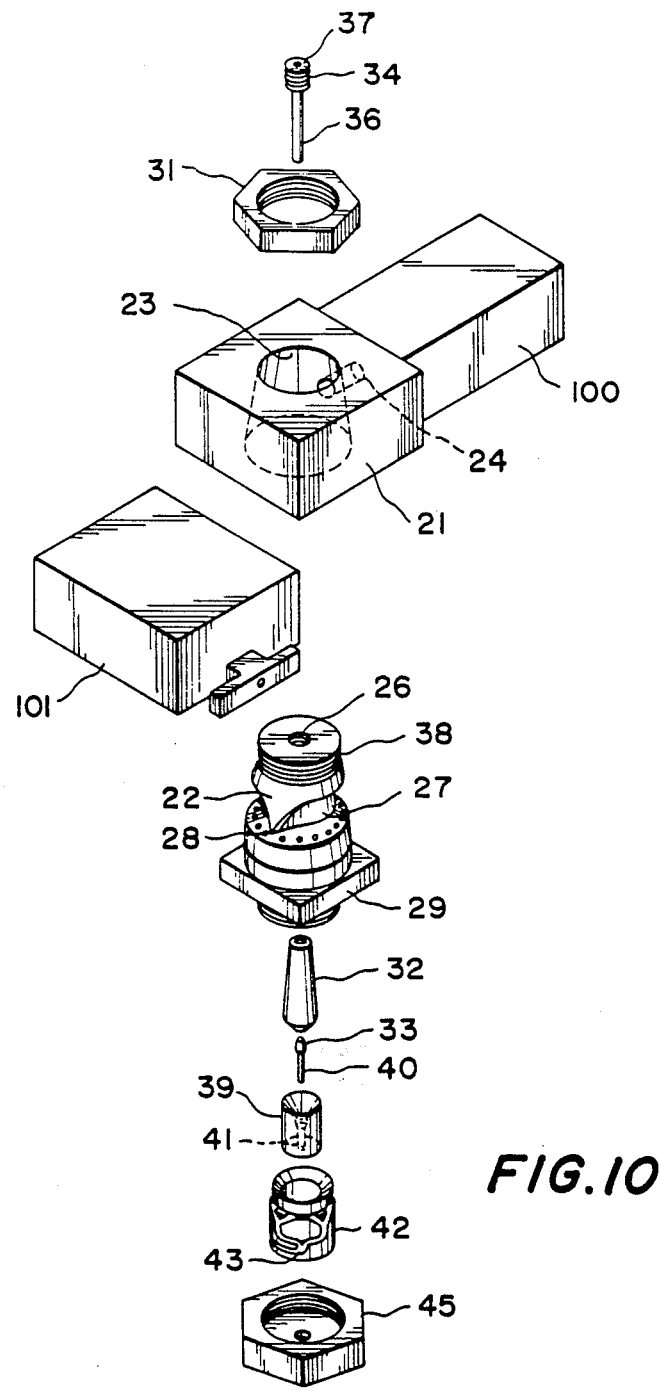
FIG. 10 is a perspective view showing the disassembled crosshead shown in FIG. 9.

FIG. 9 shows a specific embodiment of the aforementioned condition of the crosshead, and FIG. 10 shows the disassembled condition of the crosshead shown in FIG. 9 together with extruding machines for the first and second layers.

In FIGS. 9 and 10, reference numeral 21 designates a crosshead cover, the inside of which has a tapered opening 23 for inserting a cartridge 22 and a hole 24 communicating with the opening 23 for supplying rubber composition to the opening 23. The crosshead cover 21 is connected to an extruding machine 100 for extruding a thermoplastic rubber for forming the first layer, so that thermoplastic rubber is supplied from the extruding machine 100 to the cartridge 22 through the supply hole 24.

The cartridge 22 is of substantially truncated conical shape, the interior of which has a stepped opening 26 which is capable of receiving a nipple holder 25. Around the circumference of the cartridge 22, a recess 27 is formed to form a passage of the thermoplastic rubber in the gap between the cartridge 22 and the crosshead cover 21 is defined, when the cartridge 22 is inserted into the crosshead cover 21. The cartridge 22 is radially provided with a plurality of apertures 28 communicating with the opening 26 around the whole circumference thereof on the substantially downstream side of the recess 27. Though the depth of the recess 27 varies dependent upon positions, the thermoplastic rubber is supplied with circumferentially uniform pressure to the interior of the opening 26 through the radial apertures 28. The bottom of the cartridge 22 is provided with a base 29, on which a supply hole 30 for introducing a thermoplastic resin such as a liquid crystalline high-molecular material into the opening 26 of the cartridge 22 from the extruding machine 101 is defined.

The cartridge 22 is inserted into the opening 23 from the underside of the crosshead cover 21, and a screw positioned on the outside at the upper part of the cartridge 22 which is projected from the upper part of the crosshead cover 21 is secured by means of a nut 31, so that the cartridge 22 is fixed to the crosshead cover 21.

A nipple holder 32 is mounted on the upper part of the cartridge opening 26. The nipple holder 32 is provided with a hole 35 for holding a nipple 33 and at the same time inserting a guide screw 34 thereinto.

The guide screw 34 is provided with a nozzle 36 having an inner diameter of several mm which functions as a guide in the case that the fiber 1 is introduced into the nipple 33 at the time of commencing wire drawing of the fiber 1. This nozzle 36 is based on the consideration for workability and therefore, such means is not essentially required during operation of an apparatus. A portion of the screw 37 is screwed into an opening 38 defined inside the upper part of the cartridge 22.

The nipple holder 32 holds the nipple 33 and at the same time, ensures a flow path for coating materials. More specifically, the upper outside tapered portion of the nipple holder 32 is inserted from the underside of the cartridge opening 26 thereinto to fit it with the cartridge opening 26. The first layer coating material flowed into the interior through the cartridge opening 26 passes through the gap defined between the nipple holder 32 and the cartridge 22 and is introduced into a die 39 disposed inside the lower part of the cartridge opening 26. The extreme end of the nipple holder 32 is tapered in parallel with the tapered plane of the die 39 so as to define a flow path of a constant distance therebetween.

An exposed base of the nipple 33 is placed in face to face relation with respect to the circumference of a tapered nozzle at the extreme end of the nipple holder 32. An extreme end portion 40 of the nipple 33 forms a straight pipe, which is inserted into a nozzle 41 formed inside the die 39. The die 39 is provided with the nozzle 41 having a tapered portion for forming flow paths for the first and second layer coating materials These coating materials are forcibly delivered through the nozzle 41 along the traveling direction of the fiber 1. The nipple holder 32 and the tapered surface of the nipple 33 are in contact with the first layer coating material, whilst the tapered surface of the die 39 is in contact with the second layer coating material A distributor 42 is secured to the circumference of the die 39. The distributor 42 holds the die 39 inside thereof. The distributor 42 is provided with a groove 43 for supplying the second layer coating material with circumferentially uniform pressure on the circumference thereof. The groove 43 is successively branched from the position corresponding to the supply hole 30 and extends upwardly. The upper surface of the distributor 42 is in face to face relation with the tapered upper surface of the die 39, so that the second layer coating material introduced through the groove 43 is further introduced into the tapered nozzle 41 of the die 39.

The distributor 42 containing the die 39 inserted therein is inserted from the underside of the cartridge opening 26 thereinto, so that the flow of the second layer coating material is turned back by means of a portion of an inner flange 44 formed inside the cartridge opening 26 so that the second layer coating material joins with the first layer coating material in the gap between the nipple holder 32 and the die 39 to be introduced in the die 39 as a two-layered flow.

A cap nut 45 holds the distributor 42 and which is screwed with a screw 46 formed on the outer lower surface of the cartridge 22. In this case, since the pitch of the screw thread of the screw 46 is known already, the spacing defined between the nipple 33 and the die 39 is precisely established by rotating the cap nut 45 from the screwed position with a suitable number of rotations in such a way that the nipple 33 or the nipple holder 32 comes in contact with the die 39.

It is to be noted that the upper structure of the crosshead, i.e., a resin flow path structure extending from the outlet of the extruding machine to the die-nipple arrangement is not specifically limited to the above described embodiment. Any structure may be applied to the present invention so far as each of thermoplastic resin materials is concentrically placed in a spacing defined between the die and the nipple, and these materials may be uniformly supplied without unevenness and stagnation thereof.

According to the extrusion coating in the present invention, not only the simultaneous coating of the two layers, but also single layer coating is possible. In either case, the rate of shear in the die nozzle becomes maximum on the wall surface of the nozzle. For instance, when a fiber (12.5 $\mu$m diameter) is coated by using a nozzle having an inner diameter of 0.9 mm, a rate of shear on the wall surface of the nozzle becomes $10^3$ sec$^{-1}$ or more, when the fiber speed is 10 m/min. or less. Namely, the coefficient of linear expansion of the second coated layer becomes $1 \times 10^{-5}$°C.$^{-1}$ or less under normal coating conditions in accordance with the present invention, so that no particular operation is required in this connection. Furthermore, since the linear expansion coefficient or Young's modulus of the orientated second coated layer are maintained even after cooling the same, apparatuses such as a heat-treating oven or the like used in conventional secondary coating methods become unnecessary. As a result, the fiber drawing apparatus can be simplified and coating can be performed at high speed. In addition, two layers can be coated in a single coating step.

As will be described in the following Comparative Example 3, a back flow of resin through the inside of the nipple is observed in case the inner diameter of the straight pipe portion of the nipple is 0.5 mm or more. Accordingly, in this case, a fiber of continuous length cannot be coated. Thus, the inner diameter of the nipple is limited to a range of 0.5 mm or less. Further, the apparatus for supplying the coating materials is not limited to the extruding machine but any kind of apparatus which can supply molten materials continuously, such as a gear pump can be effectively used.

EXAMPLE GROUP I

While the present invention will be described in more detail hereinbelow in fiber of conjunction with examples and comparative examples, it is to be understood that the present invention is not limited to such examples.

In the following examples and comparative examples, the following materials were used.
fiber diameter: 125 $\mu$m
fiber speed: 300 m/min.
outer diameter of first (inner) layer: 400 $\mu$m
out diameter of second (outer) layer: 900 $\mu$m composition of first (inner) layer coating
material: 98% by weight of SBS/oil blend comprising 70% by weight of a styrene-butadienestyrene copolymer (28 weight % styrene concentration) and 30% by weight of a naphthenic oil, and 2% by weight of heat stabilizer second (outer) layer coating material: PET/POB copolymer (including 40 mol % PET).

EXAMPLE 1

A coating experiment was effected by employing a die-nipple having the construction shown in FIG. 7 wherein the dimensions were: 0.4 mm inner diameter of the nipple, 0.9 mm inner diameter of the die, 7 mm die nozzle length, and 2 mm distance from the extreme end of the nipple to the outlet of the die nozzle. In this case, the resin pressure became 320 kg/cm$^2$, and the fiber could be coated over a length of 18 km or more. The eccentricity (the distance between the centers of the fiber and the coating) was $\pm 15$ $\mu$m or less. Average breaking strength of the coated fiber (gauge length: 10 m, n=50) was 6.7 kg per one fiber. The transmission loss of the coated optical fiber was 2.8 dB/km at a wavelength of 0.85 $\mu$m and 0.6 dB/km at a wavelength of 1.55 $\mu$m. The values of the aforesaid transmission loss did not vary within a temperature range from $-75°$ C. to $+80°$ C.

COMPARATIVE EXAMPLE 1

The die-nipple having the construction shown in FIG. 1 was utilized and the dimensions were: 0.18 mm inner diameter of the nipple, 0.45 mm die nozzle diameter, and 5 mm die nozzle length In this case, the resin pressure exceeded 400 kg/cm$^2$ and the resin held fiber in a region where the flow rate of the resin was comparatively slow in the vicinity of the inlet of the die nozzle, so that no coating could be carried out

COMPARATIVE EXAMPLE 2

Figure 2:
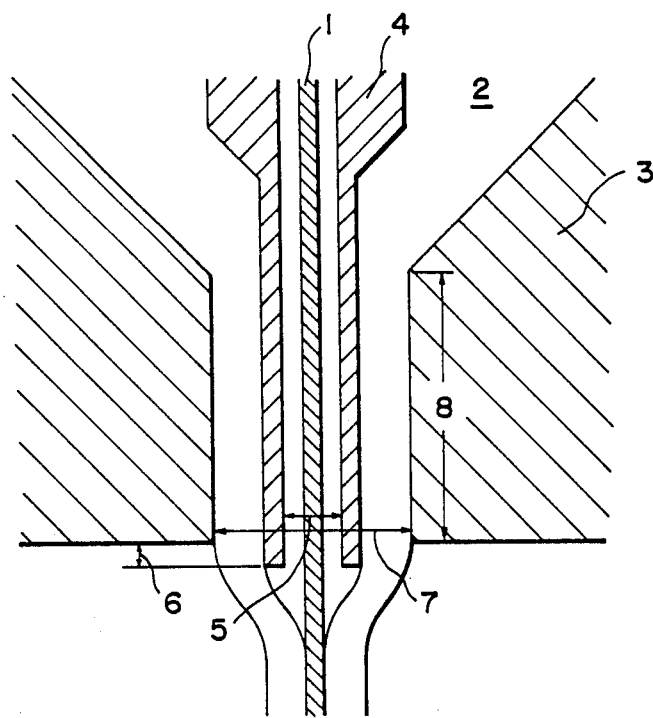

The die-nipple having the construction shown in FIG. 2 was used and the dimensions were: 2 mm nipple inner diameter, 4.5 mm die nozzle diameter, and 8 mm die nozzle length In this case, the resin pressure became 260 kg/cm$^2$, and the fiber could be coated over a length of 8 km. However, since the surface of the fiber was not adherent to the first (inner) layer, an eccentricity ranged from $\pm 80$ to 250 $\mu$m, and an average breaking strength was 2.0 kg per one fiber (gauge length: 10 m, n=50). The transmission loss of the coated optical fiber was 3.0 dB/km at a wavelength of 0.85 $\mu$m and 0.8 dB/km at a wavelength of 1.55 $\mu$m. The values of the aforesaid transmission loss did not vary within a temperature range from −75° C. to +80° C.

EXAMPLE 2

The die-nipple having the construction shown in FIG. 8 was utilized and the dimensions were: 0.4 mm inner diameter of the nipple, die nozzle diameter of 1.5 mm at the inlet portion and 0.9 mm at the outlet portion, and 2.5 mm distance from the extreme end of the nipple to the outlet of the die nozzle. In this case, the resin pressure became 380 kg/cm$^2$, and the fiber could be coated over a length of 7 km or more. The average breaking strength of the coated optical fibers was 6.4 kg per one fiber, and the transmission loss thereof was substantially the same as that of Example 1.

COMPARATIVE EXAMPLE 3

In Example 1, a nipple having an inner diameter of 0.5 mm was utilized. In this case, resin pressure, eccentricity, breaking strength, transmission loss and the like were the same as those of Example 1, but a back flow of the resin arose through the inside of the nipple, so that the fiber was broken at the time that the fiber was coated over a length of 2 km.

As described above, a coated optical fiber having a two-layer coated structure composed of a first (inner) layer of a thermoplastic rubber composition having a low Young's modulus and a second (outer) layer of a thermoplastic resin having a low linear expansion coefficient and a high Young's modulus is fabricated in a single and high speed coating process in accordance with the present invention and hence there is an advantage in that significant economization of optical fiber cables becomes possible.

Next, the second aspect of the present invention will be described hereinbelow.

According to the detailed research by the present inventors, it has been found that a coated optical fiber fabricated by forcibly cooling at least the second layer of the coated layers at the melting point thereof or less within one second immediately after the coating exhibits excellent transmission characteristics, particularly excellent low-temperature characteristics over a wide range of coating film thickness and a wide coating speed.

With the above in view, in the second aspect of the present invention, a coated optical fiber is fabricated by simultaneously coating the first layer of a thermoplastic rubber composition and the second layer of a thermoplastic resin composition of molecular orientation on an optical fiber immediately after spinning the optical fiber by heating to soften the optical fiber preform with the use of a crosshead of one extruding machine At least the second layer of the simultaneously coated two layers in the crosshead is forcibly cooled at the crystallization temperature or less of the thermoplastic resin composition of molecular orientation.

In the apparatus for fabricating a coated optical fiber according to the present invention, a cooling cylinder for cooling the coating of the coated optical fiber is provided on the outlet side of the crosshead of the extruding machine with or without contacting the crosshead. The interior of the cylinder is filled with liquid, gas, or the mixture thereof to bring it into contact with the coated optical fiber The present invention has been made on the basis of the results of detailed studies of relationships between the film thicknesses of the first layer (low Young's modulus layer) and the second layer (high Young's modulus and low linear expansion coefficient layer) and the transmission characteristics of the resulting coated optical fibers as well as relationships between coating speed and transmission characteristics of the coated optical fibers.

Namely, as is understood from the following examples of the present invention and comparative examples, the transmission loss at a low temperature increases with the increase in ratio of the film thickness between the first and second layers as well as the coating speed in the case where no treatment is given for the coated optical fiber after the coating thereof (i.e., air-cooling), whilst no increase in such a transmission loss as described above is observed in the case where the coated fiber is cooled forcibly immediately after the coating thereof by the use of liquid and/or gas coolant. Although the reasons for the above phenomena are not clear, it may be presumed that microbending of the glass fiber arises easily due to contraction based on orientation relaxation of the second layer in the case of air-cooling (slow cooling), whilst molecular orientation of the second layer is instantly fixed in case of fast cooling and as a result, there is no contraction, so that microbending of the glass fiber is prevented.

Figure 11:
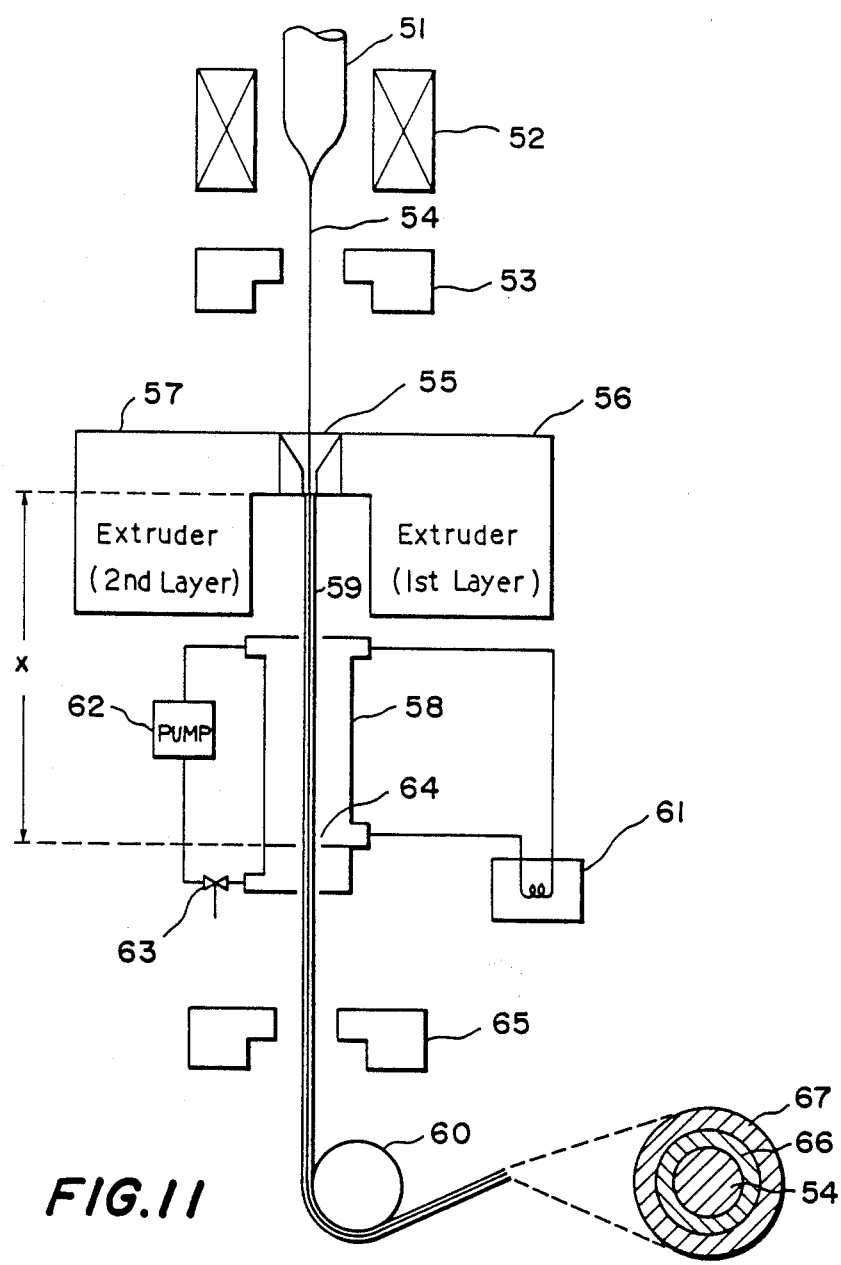
FIGS. 11 and 12 are schematic typical views each showing an embodiment of an apparatus for fabricating a coated optical fiber in the second mode of the present invention.

FIG. 11 is a schematic view showing an embodiment of a construction of an apparatus according to the present invention. In FIG. 11, reference numeral 51 designates a fiber preform, 52 a heating oven, 53 a diameter monitor for an optical fiber 54, 55 a crosshead of an extruding machine having the construction as described above, 56 and 57 first and second layer extruding machines, 58 a cooling cylinder for a coated optical fiber 59 supplied from the crosshead 55, 60 a fiber take-up capstan, 61 a cooling and/or supply tank for coolant, 62 a pump for circulating the coolant, 63 a three-way cock, 64 an outlet for the cooling cylinder, and 65 a diameter monitor for the coated optical fiber 59, respectively. The coated optical fiber 59 is prepared by forming the first and second layers 66 and 67 around the optical fiber 54.

In the crosshead 55 of the extruding machine, the optical fiber 59 having the two layers simultaneously coated is cooled by the cooling cylinder 58 filled with the coolant. The coolant is either circulated through the cooling tank 61 at a constant temperature, or supplemented from the cooling-supply tank 61 under a low temperature condition. In the case where the coolant is gas, the three-way cock 63 is opened. In the case where the coolant is liquid, the outlet 64 of the cooling cylinder 58 is of a sealed construction in order to prevent leakage of the liquid, or cooling liquid leaked from the cooling cylinder outlet 64 is circulated to the cooling cylinder 58 by the pump 62.

In conventional extrusion coating for metal wire materials, coated layers are annealed or slowly cooled in order to promote orientation relaxation of the coated layers. On the contrary, in the present invention, the second layer is cooled rapidly immediately after the coating in order to prevent orientation relaxation of the second layer. Such cooling is carried out within one second after coating the second layer at the crystallization temperature thereof or less Thus, it is required to cool the second layer at the crystallization temperature thereof or less before the coated optical fiber reaches a distance satisfying a condition expressed by $x/V \leq 1$, where V (m/sec.) is the traveling speed of the fiber, and x (m) is the distance from the crosshead outlet to the outlet of the cooling cylinder 58. In other words, the upper limit of the length of the cooling cylinder 58 is the distance x and in this case, the inlet of the cooling cylinder 58 is in contact with a die of the crosshead 55.

Figure 12:
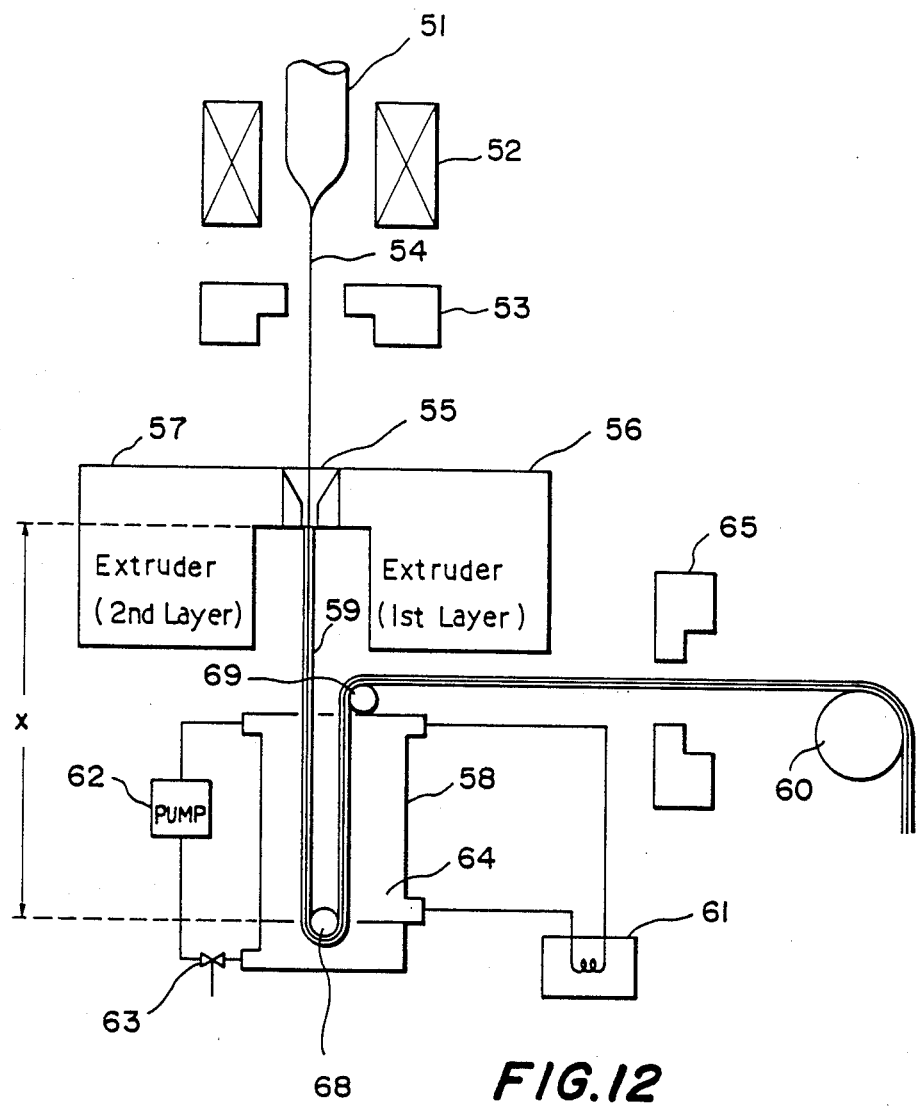

In the case where the coolant is liquid, the apparatus may be modified as shown in FIG. 12. Here, a pulley 68 is provided inside the cooling cylinder 58 in order to prevent the leakage of the liquid, and the coated fiber is taken out from the upper part of the cooling cylinder 58 through a pulley 69, as shown in FIG. 12. In this case, it is preferable that the distance X from the outlet of the crosshead 55 to the pulley 68 is within the range as mentioned above.

The coolant for a coated optical fiber used in the present invention may be liquid, gas, or the mixture thereof having a specific heat of 0.1 kcal/kg.°C. or more at an ordinary temperature and a thermal conductivity of 0.01 kcal/m.hr° C. or more. Examples of such coolant include water, glycerin, alcohols such as methyl alcohol, ethyl alcohol and the like, various oils such as mineral oil, processed oil and the like, and inert gases such as Freon, helium, neon and the like. The coolant comes into contact with the coated optical fiber 59 in the cooling cylinder 58 positioned immediately below the extruding machines 56 and 57 to forcibly cool the coated optical fiber 59. Here, the temperature and flow rate for supplying the coolant are set so as to satisfy the aforesaid condition $x/V \leq = 1$.

EXAMPLE GROUP II

Coated optical fibers were fabricated in accordance with the conditions shown in Table 1, wherein the diameter of the glass fiber used was 125 μm, SBS means a composition comprising 70 parts by weight of SBS (28 weight % styrene concentration), 30 parts by weight of naphthenic oil, and 2 parts by weight of a stabilizer, and SEBS means a composition comprising SEBS (14 weight % styrene concentration) in place of SBS (its make-up is the same as that of the SBS composition). PET/POB (40/60 mol%) copolymer (310° C. melting point, 170° C. crystallization temperature) was used for a second layer coating material Furthermore, the extrusion temperature of the crosshead 55 of the extruding machine utilized was 270° C. The die nozzle diameter was 0.9 mm. The die nozzle length, was 5 mm. The nipple inner diameter was 0.2 mm and the land length (the distance from the extreme end portion 11A of the nipple 11 to the outlet of the die nozzle 12A in FIG. 7 or 8) were 2 mm. In addition, the cooling length for the coated optical fiber 59 in the lower part of the extruding machine crosshead 55 was 1.5 m, and the distance between the cooling cylinder 58 and the outlet of the crosshead 55 was 10 cm, so that the relationship between fiber speed V=100 cm/min. and distance x m from the crosshead outlet to the cooling cylinder outlet became $x/V = 1.6/100$ min.$\simeq 1$ sec. In these examples, coolant was supplied at an ordinary temperature.

TABLE 1

(Example Group II)

| | First Layer Material | Outer Diameter of 1st Layer (μm) | Outer Diameter of 2nd Layer (μm) | Coating Speed (m/min) | Coolant | Temperature[3] (°C.) | Transmission[1] Loss (dB/km) 20° C. | −75° C.[2] |
|---|---|---|---|---|---|---|---|---|
| Reference Example 1 | SBS | 500 | — | 100 | — | 200 | 2.4 | ±0 |
| Reference Example 2 | SBS | 500 | — | 500 | — | 230 | 2.5 | +0 |
| Reference Example 3 | SEBS | 900 | — | 100 | — | 220 | 2.5 | +0.1 |
| Reference Example 4 | SEBS | 900 | — | 500 | — | 250 | 2.5 | +0.2 |
| Example 1 | SBS | 500 | 600 | 100 | Water | 70 | 2.4 | ±0 |
| Example 2 | SBS | 500 | 1000 | 100 | Water | 90 | 2.5 | ±0 |
| Example 3 | SBS | 500 | 1000 | 500 | Water | 110 | 2.6 | ±0 |
| Example 4 | SEBS | 500 | 600 | 100 | Glycerin | 90 | 2.5 | +0.1 |
| Example 5 | SEBS | 500 | 1000 | 100 | Glycerin | 110 | 2.4 | +0.2 |
| Example 6 | SEBS | 500 | 1000 | 500 | Glycerin | 130 | 2.4 | +0.2 |
| Example 7 | SBS | 500 | 1000 | 500 | Helium | 160 | 2.6 | +0.3 |
| Example 8 | SEBS | 500 | 1000 | 500 | Helium | 160 | 2.8 | +0.4 |
| Comparative Example 1 | SBS | 500 | 600 | 100 | — | 210 | 2.8 | +0.4 |
| Comparative Example 2 | SBS | 500 | 1000 | 100 | — | 230 | 4.5 | +10.5 |
| Comparative Example 3 | SBS | 500 | 1000 | 500 | — | 260 | 6.3 | +32.0 |
| Comparative Example 4 | SEBS | 500 | 600 | 100 | — | 200 | 2.7 | +0.8 |
| Comparative Example 5 | SEBS | 500 | 1000 | 100 | — | 240 | 5.7 | +14.5 |
| Comparative Example 6 | SEBS | 500 | 1000 | 500 | — | 250 | 8.5 | +42.0 |
| Comparative Example 7 | SBS | 300 | 1000 | 500 | — | 260 | 9.4 | +45.0 |

[1]Measured at a wavelength of 0.85 μm
[2]Amount change from a value of loss at 20° C.
[3]Surface temperature of the coated layer at the point (outlet of cooling cylinder) apart from crosshead outlet by 1.6 m The second aspect of the present invention will be described more specifically in connection with the following examples of the present invention and comparative examples. This aspect of the present invention is not limited thereto.

EXAMPLE GROUP III

Coated optical fibers were fabricated in accordance with the conditions shown in Table 2 wherein the coating conditions in Table 2 are the same as those of Table 1.

Giving an outline of Tables 1 and 2, while favorable transmission characteristics can be obtained in such fibers coated with the single layer of SBS or SEBS (Reference Examples 1-4 in Table 1) without their being forcibly cooled, the transmission characteristics were remarkably deteriorated when the two layers were simultaneous coated, if its coating material composition was out of the range specified according to the present invention, or if the coated fiber was not forcibly cooled, and particularly if its coated film thickness was thick and the coating speed was high (Comparative Examples 1-7 in Table 1, and Comparative Examples 1-4 in Table 2). On the contrary, it is apparent, according to the present invention, that good transmission characteristics are obtained, even if a coated film thickness is thick and a coating speed is high (Examples 1-8 in Table 1, and Examples 10-12 in Table 2).

EXAMPLE GROUP IV

Coated optical fibers were fabricated in accordance with the conditions shown in Table 3-1 and 3-2, and the results thereof are also shown in Tables 3-1 and 3-2.

As is apparent from Tables 3-1 and 3-2, it is understood that when a composition of coating material and a rate of shear were out of the range specified in accordance with the present invention, the mechanical properties of the resulting coated optical fibers were deteriorated.

TABLE 2

(Example Group III)

| | First Layer[1] | | Second Layer[3] | | | Coating | Transmission Loss[4] | |
|---|---|---|---|---|---|---|---|---|
| | Composition[2] (SBS/Oil, part by weight) | Coated Outer Diameter ($\mu$m) | Composition (PET/POB, mol %) | Coated Outer Diameter ($\mu$m) | Coolant | Speed (m/min) | 20° C. (dB/km) | −75° C.[5] (dB/km) |
| Example 1[6] | 95/5 | 200 | 40/60 | 400 | none | 300 | 2.4 | +0.2 |
| Example 2[7] | 95/5 | 200 | 40/60 | 400 | none | 300 | 2.6 | +0.2 |
| Example 3[6] | 40/60 | 300 | 40/60 | 500 | none | 300 | 2.7 | +0.1 |
| Example 4[7] | 70/30 | 300 | 40/60 | 500 | none | 300 | 2.5 | +0.2 |
| Example 5[6] | 95/5 | 200 | 40/60 | 400 | none | 600 | 2.4 | +0.2 |
| Example 6[8] | 70/30 | 300 | 60/40 | 400 | none | 300 | 2.5 | +0.3 |
| Example 7[8] | 70/30 | 300 | 30/70 | 400 | none | 300 | 2.7 | +0.3 |
| Example 8[8] | 70/30 | 300 | 50/50 | 400 | none | 300 | 2.6 | +0.2 |
| Example 9[8] | 70/30 | 300 | 40/60[9] | 400 | none | 300 | 2.3 | +0.2 |
| Example 10[8] | 70/30 | 300 | 40/60 | 1000 | water | 300 | 2.4 | +0.1 |
| Example 11[8] | 70/30 | 300 | 40/60 | 1000 | water | 600 | 2.6 | +0.1 |
| Example 12[8] | 70/30 | 400 | 40/60 | 1200 | water | 600 | 2.5 | +0.2 |
| Comparative Example 1[6] | 100/0 | 200 | 40/60 | 400 | none | — | (Fiber Broken) | |
| Comparative Example 2[6] | 30/70 | 200 | 40/60 | 400 | none | — | (Impossible to extrude 1st Layer) | |
| Comparative Example 3[8] | 70/30 | 300 | 70/30 | 500 | water | 300 | 2.8 | +8.6 |
| Comparative Example 4[8] | 70/30 | 300 | 20/80 | 500 | water | 300 | 2.7 | +7.8 |

[1]Styrene thermoplastic rubber (SBS) compositions
[2]Containing 2 parts by weight of a heat stabilizer (Irganox 1010)
[3]PET/POB and the compositions thereof
[4]Measured at wavelength 0.85 $\mu$m
[5]Amount in change from a value of loss at 20° C.
[6]40 wt % styrene concentration
[7]20 wt % styrene concentration
[8]24 wt % styrene concentration
[9]Containing 30% by weight of polyester elastomer (Hytrel)

TABLE 3

(Example Group IV)

| | Composition (PET/POB, mol %) | Rate of Shear (sec$^{-1}$) | Extrusion Temperature (°C.) | Linear Expansion Coefficient (°C.$^{-1}$) 25° C. | Young's Modulus (GPa) 25° C. | Allowable Bending Radius (mm) |
|---|---|---|---|---|---|---|
| Example 1 | 60/40 | $1 \times 10^3$ | 240 | $1-2 \times 10^{-5}$ | | |
| Comparative Example 1 | 70/30 | $1 \times 10^3$ | 240 | $6.1 \times 10^{-5}$ | | |
| Example 2 | 30/70 | $1 \times 10^3$ | 240 | $-3.5 \times 10^{-6}$ | | 4 |
| Comparative Example 2 | 20/80 | $1 \times 10^3$ | 240 | $-4.0 \times 10^{-6}$ | | 6 |
| Example 3 | 40/60 | $1 \times 10^2$ | 240 | $7 \times 10^{-6}$ | 4.3 | |
| Example 4 | 50/50 | $1.4 \times 10^2$ | 220 | $7 \times 10^{-5}$ | 10 | |
| Example 5 | 50/50 | $9.8 \times 10^2$ | 220 | $4 \times 10^{-6}$ | 21 | |
| Comparative Example 3 | 40/60 | $2 \times 10^1$ | 240 | $1.8 \times 10^{-5}$ | 3 | |
| Example 6 | 40/60 | $1.9 \times 10^2$ | 310 | $-2.5 \times 10^{-6}$ | 18.2 | |
| Example 7 | 50/50 | $1.9 \times 10^2$ | 315 | $1 \times 10^{-6}$ | 11.4 | |
| Example 8 | 40/60 + 30 30 wt% Hytrel | $1.9 \times 10^2$ | 220 | $-2 \times 10^{-6}$ | 18 | |
| Example 9 | 40/60 + 30 30 wt % Hytrel | $1.9 \times 10^2$ | 300 | $-1 \times 10^{-6}$ | 11 | |

TABLE 3-continued (Example Group IV)

| | Composition (PET/POB, mol %) | Rate of Shear (sec$^{-1}$) | Extrusion Temperature (°C.) | Linear Expansion Coefficient (°C.$^{-1}$) 25° C. | Young's Modulus (GPa) 25° C. | Permissible Bending Radius (mm) |
|---|---|---|---|---|---|---|
| Example 10 | NA/POB = 50/50 | 210 | 300 | $-4 \times 10^{-6}$ | 40.0 | ($\epsilon_b \sim 3\%$) |
| Example 11 | NA/POB = 40/60 | 210 | 300 | $-6 \times 10^{-6}$ | 47.3 | |
| Example 12 | PET/POB/TPA/IPA/BisA = 45/45/2.5/2.5/5 + 2 wt % Chain Extender | 170 | 280 | $9 \times 10^{-6}$ | 12.1 | ($\epsilon_b \sim 5\%$) |
| Example 13 | PET/POB = 55/45 + 2 wt % Chain Extender | 230 | 280 | $1.0 \times 10^{-5}$ | 7.5 | ($\epsilon_b \sim 6.6\%$) |
| Example 14 | TPA/POB/NA/BP = 15/65/10/10 | 210 | 275 | $-4 \times 10^{-6}$ | 50.4 | ($\epsilon_b \sim 3.6\%$) |
| Example 15 | PET/POB = 48/52 | 210 | 325 | $1.1 \times 10^{-5}$ | 8.8 | ($\epsilon_b \sim 5.9\%$) |

Full name of abbreviation
NA: 6-Hydroxy-2-naphtoic acid
TPA: Terephthalic acid
IPA: Isophthalic acid
BisA: Bisphenol A (diphenyldimethylmethane-4,4'-diol)
BP: 4,4'-Biphenol (4,4'-diphenyl diol)
Chain Extender: 1,3-Phenylene-bis-$\Delta^2$-oxazoline-2

As described above, in accordance with the second aspect of the present invention, an optical fiber is coated with the first layer of a thermoplastic rubber composition having a low Young's modulus and the second layer of thermoplastic resin of molecular orientation with wide ranges of a coating film thickness and a coating speed and hence, there is an advantage that inexpensive and highly reliable coated optical fibers are obtained In addition, the coated layer of the coated optical fiber can chemically be dissolved to remove it without damage to the surface of the optical fibers at the time of connecting them to one another, so that there are such advantages that workability of the coated optical fiber of the present invention is excellent and that the strength in connected portions of the optical fibers is also improved The transmission characteristics of the coated optical fiber according to the present invention will be discussed hereunder.

Figure 13:
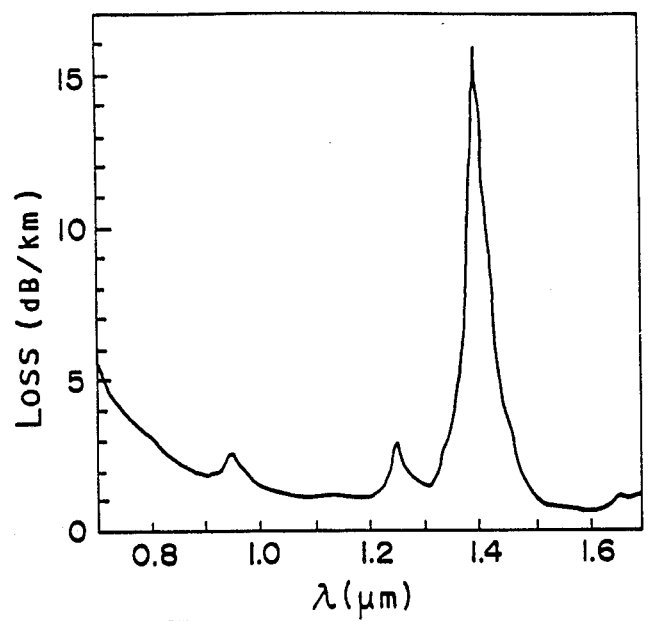
FIG. 13 is a graph illustrating the loss spectrum of the coated optical fiber according to the present invention.
Figure 14:
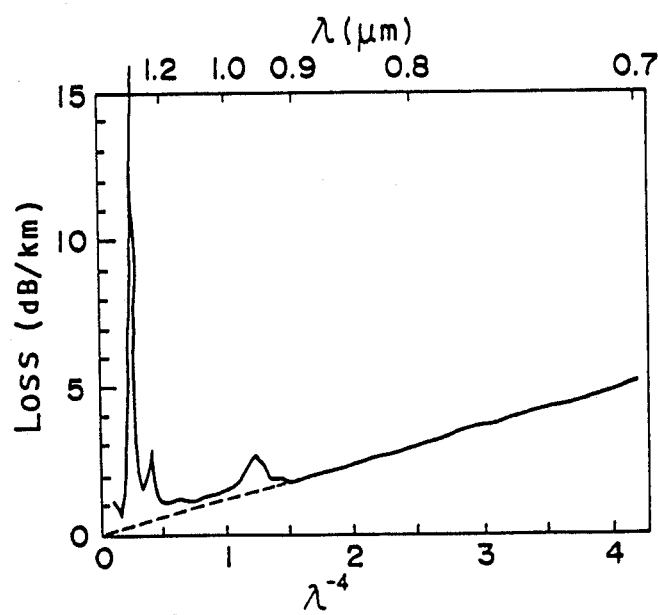
FIG. 14 is a characteristic diagram wherein loss is plotted with respect to $\lambda^{-4}$ in the case of the coated optical fiber of FIG. 13.

The loss spectrum of a coated optical fiber having two coating layers in accordance with SBS/PET.POB coated by simultaneous extrusion (a coating speed of 100 m/min., and a diameter of first layer/a diameter of second layer=500/600 μm) is illustrated in FIG. 13, whilst a relationship between loss and 1/λ$^4$ (λ: wavelength) is shown in FIG. 14. In FIG. 13, loss peaks in the vicinities of λ=0.95, 1.25 and 1.4 μm are caused by OH absorption due to the use of a VAD preform which has not yet been dehydrated. Loss values of the coated optical fiber was 2.42 dB/km at λ=0.85 μm and 1.50 dB/km at λ=1.30 μm. The minimum loss was 0.61 dB/km (λ=1.59 μm). As is clear from FIG. 14, a loss due to incomplete structure (a value obtained by extrapolating λ$^{-4}$ to 0) is hardly observed. These characteristic were substantially the same as a those of a conventional optical fiber coated with silicone.

Figure 15:
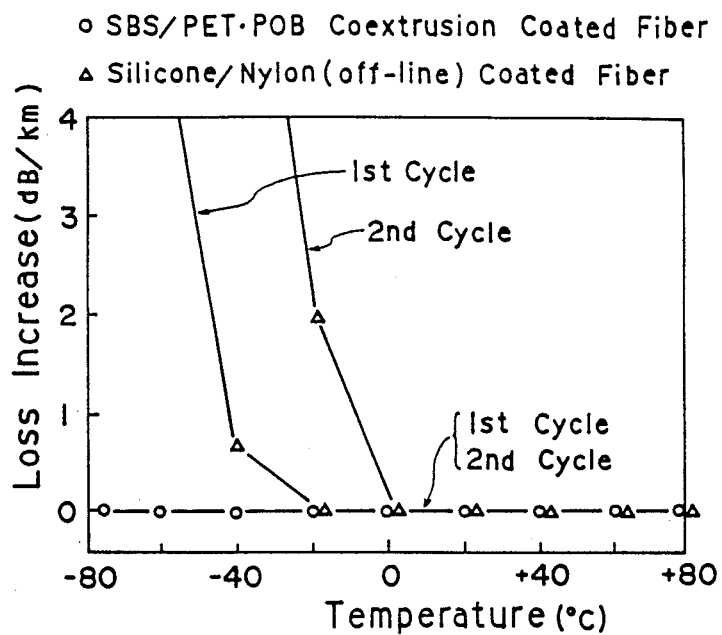
FIG. 15 is a characteristic diagram illustrating comparatively temperature-dependency of transmission loss in case of a coated optical fiber according to the present invention and a conventional coated optical fiber.

FIG. 15 shows the temperature dependency of the transmission loss (0.85 μm wavelength) with respect to a temperature change of +20° C.→−75° C.→+80° C.→+20° C. The loss increases rapidly at −40° C. or less (first cycle) in a conventional optical fiber (marked Δ) coated with silicone/nylon, whilst the loss hardly increases up to −75° C. and its value was +0.05 dB/km or less in the optical fiber coated simultaneously with two layers of SBS/PET·POB (marked 0). This is because Tg (−70° C. or less) of the SBS composition for the first layer is lower than that (−40° to −60° C.) of silicone. Furthermore, the starting temperature of the increase in loss rises (0° C. or less, second cycle) by means of thermal hysteresis at +80° C. in the conventional silicone/nylon coated optical fiber, whilst no such increase in loss was observed in the coated optical fiber having two layers simultaneously coated according to the present invention.

Figure 16:
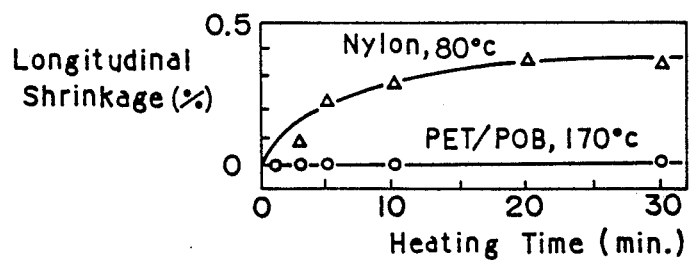
FIG. 16 is a characteristic diagram illustrating comparatively shrinkage strain of a coated layer according to the present invention and a conventional coated layer, both after eliminating the optical fiber from the coated optical fiber, during cooling after heat-treatment.

FIG. 16 shows shrinkage strain of nylon and PET·POB during the cooling to room temperature after heat treatment of the materials. In FIG. 16 shrinkage arises by heating nylon at 80° C. for several minutes, whilst no shrinkage was observed in PET·POB even at a higher temperature (170° C.). From these results, it is understood that the increase of loss in the second cycle of FIG. 15 is promoted by the shrinkage strain due to thermal hysteresis of the nylon layer, while the loss does not increase even by thermal hysteresis of 80° C. or more in the coated optical fiber having two layers coated simultaneously with SBS/PET·POB according to the present invention.

What is claimed is:
1. A coated optical fiber comprising:
an optical fiber;
a first layer of a thermoplastic rubber composition which is disposed around the circumference of said optical fiber, has a Young's modulus of 0.1 GPa or less, and is capable of extrusion coating, the thermoplastic rubber composition of said first layer comprising a styrene/butadiene block copolymer containing 20-40% by weight of styrene, a naphthenic processing oil, and a heat stabilizer as the major components, each amount of said naphthenic processed oil and said heat stabilizer being 5-150 parts by weight and 0.5-5 parts by weight, respectively, with respect to 100 parts by weight of said styrene/butadiene block copolymer; and
a second layer of a thermoplastic resin composition which is disposed around the circumference of said first layer, has a linear expansion coefficient of

$1\times10^{-5}$°C.$^{-1}$ or less and a Young's modulus of 5 GPa or more, and is capable of extrusion coating.

2. A coated optical fiber as claimed in claim 1, wherein the thermoplastic rubber composition of said first layer contains a copolymer selected form the group consisting of styrene copolymer and an olefine copolymer.

3. A coated optical fiber as claimed in claim 1, wherein the thermoplastic resin composition of said second layer comprises a resin exhibiting liquid crystallizability in the molten state as the major component.

4. A coated optical fiber as claimed in claim 1, wherein the thermoplastic resin composition of said second layer is composed of a copolymer selected from the group consisting of a polyethylene terephthalate-p-hydroxybenzoic acid copolymer containing 40-70 mol % of p-hydroxybenzoic acid and a blend of said copolymer and another polymer, and said resin composition presents a molecular orientation in the lengthwise direction of the fiber at a rate of shear of $10^2$ sec$^{-1}$ or more.

5. A coated optical fiber comprising:
   a glass fiber having a light waveguide structure;
   a first layer of a thermoplastic rubber composition formed around the circumference of said glass fiber, the thermoplastic rubber composition of said first layer comprising:
   A: a styrene/butadiene block copolymer (20-40 wt % styrene concentration)
   B: a naphthenic processing oil, and
   C: a heat stabilizer, as the major components, concentrations of the respective components of said composition being so determined that $$\frac{B}{A+B} = 5 - 40 \text{ wt \%} \text{ and } \frac{B}{A+B+C} \geqq 2 \text{ wt \%; and}$$

a second layer of a thermoplastic resin composition exhibiting liquid crystallizability in the molten state formed around the circumference of said first layer.

6. A coated optical fiber as claimed in claim 5, wherein the thermoplastic rubber composition of said first layer contains a copolymer selected from the group consisting of a styrene copolymer and an ethylene-α-olefine copolymer.

7. A coated optial fiber as claimed in claim 5, wherein the thermoplastic resin composition of said second layer is selected from the group consisting of all aromatic polyesters, aromatic-fatty polyesters, all aromatic polyester amides, aromatic-aliphatic polyester amides, aromatic polyazomethines, aromatic polyester-carbonates and mixtures thereof.

8. A coated optical fiber as claimed in claim 5, wherein the thermoplastic resin composition of said second layer is composed of a copolymer selected form the group consisting of a polyethylene terephthalate-p-hydroxybenzoic acid copolymer containing 40-70 mol % of p-hydroxybenzoic acid and a blend prepared from said copolymer and another polymer, and said resin composition prepsents a molecular orientation in the lengthwise direction of the fiber at a rate of shear of $10^2$ sec$^{-1}$ or more.

9. A coated optical fiber as claimed in claim 5, wherein the thermoplastic resin composition of said second layer is selected from the group consisting of mixtures of all aromatic polyester, aromatic-fatty polyesters, all aromatic polyester amides, aromatic-aliphatic polyester amides, aromatic polyazomethines and aromatic polyester-carbonates with other high-molecular materials.

* * * * *